United States Patent
Pettersson

(10) Patent No.: US 12,090,403 B1
(45) Date of Patent: Sep. 17, 2024

(54) AUDIO SIGNAL GENERATION

(71) Applicant: Build a Rocket Boy Games Ltd., Edinburgh (GB)

(72) Inventor: Erik Pettersson, San Diego, CA (US)

(73) Assignee: Build a Rocket Boy Games Ltd., Edinburgh (GB)

( * ) Notice: Subject to any disclaimer, the term of this patent is extended or adjusted under 35 U.S.C. 154(b) by 0 days.

(21) Appl. No.: 18/512,737

(22) Filed: Nov. 17, 2023

(51) Int. Cl.
A63F 13/54 (2014.01)

(52) U.S. Cl.
CPC ...... *A63F 13/54* (2014.09); *A63F 2300/6081* (2013.01)

(58) Field of Classification Search
CPC ........ A63F 13/28; A63F 13/355; A63F 13/44; A63F 13/45; A63F 13/54; A63F 13/77; A63F 2300/6081; A63F 13/10; A63F 13/235; A63F 13/25; A63F 13/35; A63F 13/428; A63F 13/53; A63F 13/57; A63F 13/63; A63F 13/79; G06F 3/0482; G06F 3/162; G06F 3/165; G06F 3/167; G06F 12/02; G06T 17/00; G06T 11/203; G06T 19/20; G10L 21/02; G10L 21/18; G11B 27/031; G11B 27/034; H03G 3/3005; H03G 3/02; H04N 13/344; H04N 21/4788; H04S 3/008; H04S 7/301; H04S 7/303; H04S 7/305; G06N 3/08; G08B 6/00; G10H 1/0025; G10K 15/02; G16H 40/63; H04R 1/028; H04R 3/00; H04R 5/02
See application file for complete search history.

(56) References Cited

U.S. PATENT DOCUMENTS

| | | | | |
|---|---|---|---|---|
| 6,643,744 B1* | 11/2003 | Cheng | ..................... | G06F 12/02 |
| | | | | 712/210 |
| 8,170,701 B1* | 5/2012 | Lu | .......................... | A63F 13/355 |
| | | | | 700/94 |
| 8,755,432 B2* | 6/2014 | Antonellis | ........... | G11B 27/034 |
| | | | | 369/47.1 |
| 8,958,567 B2* | 2/2015 | Tsingos | ................... | G10L 21/02 |
| | | | | 381/310 |
| 9,383,964 B1* | 7/2016 | Kuruba Buchannagari | | ................ |
| | | | | H03G 3/02 |
| 9,522,330 B2* | 12/2016 | Pile | ......................... | A63F 13/45 |
| 11,337,025 B2* | 5/2022 | Takase | .................... | A63F 13/54 |
| 2002/0161462 A1* | 10/2002 | Fay | ......................... | A63F 13/10 |
| | | | | 709/217 |

(Continued)

FOREIGN PATENT DOCUMENTS

WO    2023169934 A1    9/2023

OTHER PUBLICATIONS

Wikipedia, Fuser (video game), https://en.wikipedia.org/wiki/Fuser_(video_game), last accessed Jul. 5, 2023, 15 total pages.

(Continued)

*Primary Examiner* — Gerald Gauthier
(74) *Attorney, Agent, or Firm* — SoCal IP Law Group LLP; Jonathan Pearce

(57) ABSTRACT

The present disclosure relates to a system, method, apparatus and computer program for generating a modified audio signal associated with a computer generated three-dimensional, 3D environment in which a computer generated character is located at a character location.

25 Claims, 13 Drawing Sheets
(8 of 13 Drawing Sheet(s) Filed in Color)

(56) References Cited

U.S. PATENT DOCUMENTS

| | | | |
|---|---|---|---|
| 2003/0045956 A1* | 3/2003 | Comair | A63F 13/45 381/61 |
| 2005/0182608 A1* | 8/2005 | Jahnke | A63F 13/54 703/6 |
| 2011/0060434 A1* | 3/2011 | Bowler | A63F 13/25 700/94 |
| 2012/0040757 A1* | 2/2012 | Page | H04R 5/02 381/77 |
| 2012/0263310 A1* | 10/2012 | Fournel | A63F 13/63 381/61 |
| 2014/0100839 A1* | 4/2014 | Arendash | H03G 3/3005 381/98 |
| 2015/0348378 A1* | 12/2015 | Obana | A63F 13/28 700/94 |
| 2015/0378019 A1 | 12/2015 | Schissler et al. | |
| 2016/0187987 A1* | 6/2016 | Ullrich | G08B 6/00 345/156 |
| 2016/0191893 A1* | 6/2016 | Gewickey | H04N 13/344 386/234 |
| 2016/0269712 A1* | 9/2016 | Ostrover | H04S 7/301 |
| 2018/0260993 A1* | 9/2018 | Thumm | A63F 13/57 |
| 2019/0116448 A1 | 4/2019 | Schmidt et al. | |
| 2019/0156558 A1* | 5/2019 | Neeter | G06T 17/00 |
| 2019/0289417 A1* | 9/2019 | Tomlin | H04S 3/008 |
| 2019/0332352 A1* | 10/2019 | Anantharaman | G06F 3/167 |
| 2019/0344185 A1* | 11/2019 | Fargo | G06T 19/20 |
| 2020/0070044 A1* | 3/2020 | Seo | G06F 3/165 |
| 2020/0178018 A1* | 6/2020 | Bittner | H04S 7/305 |
| 2020/0251089 A1* | 8/2020 | Pinto | A63F 13/54 |
| 2020/0306641 A1* | 10/2020 | Kolen | A63F 13/54 |
| 2020/0324073 A1* | 10/2020 | Rajan Kesavelu Shekar | G16H 40/63 |
| 2020/0391112 A1* | 12/2020 | Yone | G06T 11/203 |
| 2021/0006976 A1* | 1/2021 | Swaminathan | A63F 13/428 |
| 2021/0339147 A1* | 11/2021 | Goldfarb | A63F 13/44 |
| 2021/0346795 A1* | 11/2021 | Gary | A63F 13/235 |
| 2022/0059071 A1* | 2/2022 | Pearce | H04N 21/4788 |
| 2022/0187883 A1* | 6/2022 | North | H04R 1/028 |
| 2022/0193549 A1* | 6/2022 | Wakeland | G06N 3/08 |
| 2022/0261436 A1* | 8/2022 | Kashyap | G11B 27/031 |
| 2022/0347574 A1* | 11/2022 | Taylor | A63F 13/53 |
| 2022/0355193 A1* | 11/2022 | Kuruba Buchannagari | G06F 3/165 |
| 2022/0387886 A1* | 12/2022 | Weising | G06F 3/162 |
| 2023/0014624 A1* | 1/2023 | Rios | G10K 15/02 |
| 2023/0018661 A1* | 1/2023 | Rios | A63F 13/54 |
| 2023/0020621 A1* | 1/2023 | Rios | G10L 21/18 |
| 2023/0044356 A1* | 2/2023 | Todd | G06F 3/0482 |
| 2023/0095273 A1* | 3/2023 | Robertson | A63F 13/77 463/35 |
| 2023/0110447 A1* | 4/2023 | Fujihara | A63F 13/35 463/31 |
| 2023/0188920 A1 | 6/2023 | Terentiv et al. | |
| 2023/0218998 A1* | 7/2023 | Armstrong | A63F 13/54 463/35 |
| 2023/0370773 A1* | 11/2023 | Hirapara | H04S 7/303 |
| 2024/0024775 A1* | 1/2024 | Mccoy | A63F 13/79 |
| 2024/0024776 A1* | 1/2024 | Mccoy | A63F 13/54 |
| 2024/0024780 A1* | 1/2024 | Mccoy | G10H 1/0025 |
| 2024/0024781 A1* | 1/2024 | Mccoy | A63F 13/63 |
| 2024/0029691 A1* | 1/2024 | Mccoy | G10H 1/0025 |

OTHER PUBLICATIONS

European Intellectual Property Office, Extended European Search Report for application No. 23209786.5, date of search, Apr. 19, 2024, 12 total pages.

Schissler et al., High-Order Diffraction and Diffuse Reflections for Interactive Sound Propagation in Large Environments, ACT Transactions on Graphics, vol. 33, No. 4, Article 369, Publication Date: Jul. 2024, 12 total pages.

United Kingdom Intellectual Property Office, Combined Search and Examination Report Under Sections 17 and 18(3) for application No. GB2317432.9, Dated May 16, 2024, 5 total pages.

Schissler et al., High-Order Diffraction and Diffuse Reflections for Interactive Sound Propagation in Large Environments, ACT Transactions on Graphics, vol. 33, No. 4, Article 369, Publication Date: Jul. 2014, 12 total pages.

\* cited by examiner

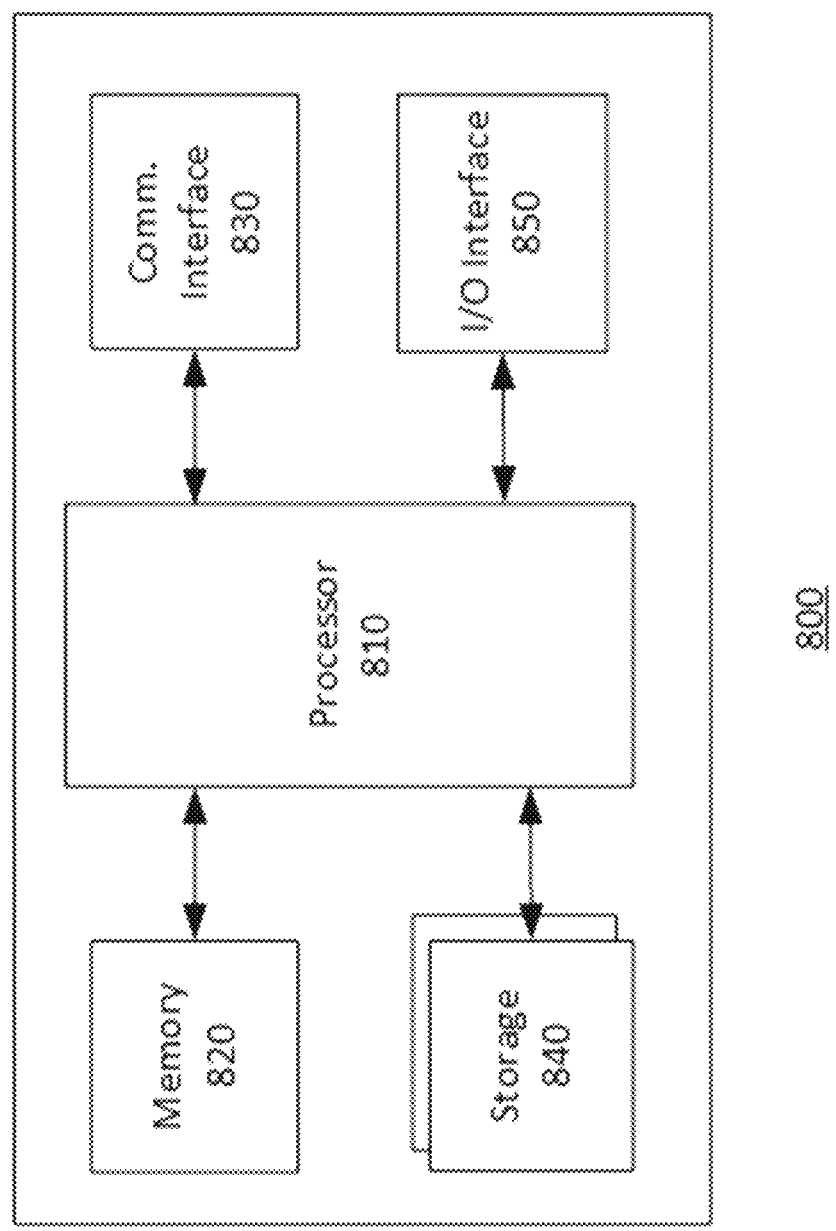

AUDIO SIGNAL GENERATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from European Union Patent Application No. 23209786.5, filed Nov. 14, 2023 and claims priority to United Kingdom Patent Application No.: 2317432.9, filed Nov. 14, 2023, both of which are entitled "AUDIO SIGNAL GENERATION" of which are incorporated herein by reference in their entirety.

BACKGROUND

Technical Field

This disclosure relates to the generation of an audio signal by applying a modification to an audio track, where the applied modification is dependent on physical features of a computer generated 3D environment that is associated with the audio track.

Background

Computer generated three dimensional, 3D, environments, such as virtual worlds in video games or on-line platforms, typically try to create a realistic or immersive experience for users controlling a computer generated character (such as an avatar) within the 3D environment. The realism of sound/audio can be an important part of this. For example, the 3D environment may include an object that has an associated audio track and therefore acts as an audio source within the virtual environment. For example, the audio source may be a noisy piece of machinery, in which case the audio track may be a recording of real-world machinery or some other form of noise. Alternatively, the audio source may be a hi-fi speaker, in which case the audio track may be a piece of music. The realism of the computer generated 3D environment may be enhanced by the altering properties of audio track, such as the volume at which the audio track is output to the user, based on the character's position within the 3D environment. For example, as the player gets closer to the audio source within 3D environment, the volume at which the audio track is output to the user may increase. There may be multiple audio sources operating in such a computer generated environment, each with their own properties and relative distance to a player character.

How audio tracks should be modified and changed as a character navigates a computer generated 3D world is typically computationally intensive. As a result, it is usually determined and fixed at the time of software development so that as the user controls the character within the 3D environment, predetermined adjustments to properties of the audio track, such as volume, will automatically be applied based on the character's position within the 3D environment relative to each audio source.

However, this is not feasible for user generated content (UGC) 3D environments, such as within a Metaverse platform or other UGC platforms, since the computer generated 3D environment is not fixed at the time of software development and could change at any time. For example, physical features of the environment, such as buildings, audio sources, or other objects, could be added, removed or altered at any time by any users participating in the environment. For example, a new audio source could be added, or the position of an audio source could be changed, or buildings could be modified to add or remove walls, doors, etc, none of which can be anticipated during software development.

Existing techniques for determining audio modifications are too computationally intensive to be performed in real-time whilst a user is interacting with the computer generated 3D environment. As such, there is a need for a more computationally efficient process for analysing in real-time a computer generated 3D environment so that an audio signal may be generated in dependence on the content of the 3D environment.

SUMMARY

In a first aspect of the disclosure there is provided a system for generating a modified audio signal associated with a computer generated three-dimensional, 3D environment in which a computer generated character is located at a character location, the system comprising a computing device configured to intermittently, and in real-time while a user is controlling the computer generated character within the computer generated 3D environment: for each of a plurality of sectors of the computer generated 3D environment: obtain physics engine data defining physical features of the sector of the computer generated 3D environment; generate a hash of the physics engine data defining physical features of the sector of the computer generated 3D environment; compare the generated hash against a previously determined, stored hash of physics engine data for the sector of the computer generated 3D environment; wherein, if the generated hash is different to the previously determined, stored hash, then: replace the previously determined, stored hash with the generated hash; generate simplified 3D environment data for the sector using the physics engine data defining physical features of the sector of the computer generated 3D environment, wherein the simplified 3D environment data for the sector comprises a simplified representation of physical features of the sector of the computer generated 3D environment; and replace previously determined, stored simplified 3D environment data for the sector with the generated simplified 3D environment data, wherein the stored simplified 3D environment data for each of the plurality of sectors together form a simplified representation of the physical features of the computer generated 3D environment; obtain an audio track associated with an audio source positioned at an audio source location in the computer generated 3D environment; determine, using the stored simplified 3D environment data for at least some of the sectors of the 3D environment, and the audio source location and/or character location, a modification to be applied to the audio track in order to generate the modified audio signal; and generate the modified audio signal by applying the modification to the audio track, wherein the physics engine data comprises graphical mesh data and generating the simplified 3D environment data for the sector comprises: converting the physics engine data to a plurality of closed bounding boxes, each closed bounding box defining a size and a location of at least part of a physical feature in the computer generated 3D environment; inverting the closed bounding box data to generate open bounding box data that defines a plurality of open bounding boxes that each represent an empty space in the 3D environment; identifying open bounding boxes that are connected; and creating a record of connected open bounding boxes such that the record identifies a plurality of connected open bounding boxes that together make up an open bounding box connected network, wherein the simplified 3D environment data for the sector comprises the open bounding box data and the record of connected open bounding boxes, and wherein determining the modification to be applied to the audio track comprises: determining, using the stored simplified 3D environment data for at least some of the sectors of the 3D environment, an audio propagation path through the computer generated 3D environment between the audio source location and the character location; and determining the modification based at least in part on a length of the audio propagation path.

In a second aspect of the present disclosure there is provided an apparatus comprising non-volatile machine-readable storage medium storing a program for generating a modified audio signal associated with a computer generated three-dimensional, 3D, environment in which a computer generated character is located at a character location, the program having instructions which when executed by a computing device cause the computing device to intermittently, and in real-time while a user is controlling the computer generated character within the computer generated 3D environment: for each of a plurality of sectors of the computer generated 3D environment: obtain physics engine data defining physical features of the sector of the computer generated 3D environment; generate a hash of the physics engine data defining physical features of the sector of the computer generated 3D environment; compare the generated hash of the physics engine data defining physical features of the sector of the computer generated 3D environment against a previously determined, stored hash of physics engine data for the sector of the computer generated 3D environment; wherein, if the generated hash is different to the previously determined, stored hash, then: replace the previously determined, stored hash with the generated hash; generate simplified 3D environment data for the sector using the physics engine data defining physical features of the sector of the computer generated 3D environment, wherein the simplified 3D environment data for the sector comprises a simplified representation of physical features of the sector computer generated 3D environment; and replace previously determined, stored simplified 3D environment data for the sector with the generated simplified 3D environment data, wherein the stored simplified 3D environment data for each of the plurality of sectors together form a simplified representation of the physical features of the computer generated 3D environment; obtain an audio track associated with an audio source positioned at an audio source location in the computer generated 3D environment; determine, using the stored simplified 3D environment data for at least some of the sectors of the 3D environment, and the audio source location and/or character location, a modification to be applied to the audio track in order to generate the modified audio signal; and generate the modified audio signal by applying the modification to the audio track, wherein the physics engine data comprises graphical mesh data and generating the simplified 3D environment data for the sector comprises: converting the physics engine data to a plurality of closed bounding boxes, each closed bounding box defining a size and a location of at least part of a physical feature in the computer generated 3D environment; inverting the closed bounding box data to generate open bounding box data that defines a plurality of open bounding boxes that each represent an empty space in the 3D environment; identifying open bounding boxes that are connected; and creating a record of connected open bounding boxes such that the record identifies a plurality of connected open bounding boxes that together make up an open bounding box connected network, wherein the simplified 3D environment data for the sector comprises the open bounding box data and the record of connected open bounding boxes, and wherein determining the modification to be applied to the audio track comprises: determining, using the stored simplified 3D environment data for at least some of the sectors of the 3D environment, an audio propagation path through the computer generated 3D environment between the audio source location and the character location; and determining the modification based at least in part on a length of the audio propagation path.

In a third aspect of the disclosure there is provided a computer implemented method for generating a modified audio signal associated with a computer generated three-dimensional, 3D, environment in which a computer generated character is located at a character location, the method comprising intermittently, and in real-time while a user is controlling the computer generated character within the computer generated 3D environment: for each of a plurality of sectors of the computer generated 3D environment: obtaining physics engine data defining physical features of the sector of the computer generated 3D environment; generating a hash of the physics engine data defining physical features of the sector of the computer generated 3D environment; comparing the generated hash of the physics engine data defining physical features of the sector of the computer generated 3D environment against a previously determined, stored hash of physics engine data for the sector of the computer generated 3D environment; wherein, if the generated hash is different to the previously determined, stored hash, then: replacing the previously determined, stored hash with the generated hash; generating simplified 3D environment data for the sector using the physics engine data defining physical features of the sector of the computer generated 3D environment, wherein the simplified 3D environment data for the sector comprises a simplified representation of physical features of the sector computer generated 3D environment; and replacing previously determined, stored simplified 3D environment data for the sector with the generated simplified 3D environment data, wherein the stored simplified 3D environment data for each of the plurality of sectors together form a simplified representation of the physical features of the computer generated 3D environment; obtaining an audio track associated with an audio source positioned at an audio source location in the computer generated 3D environment; determining, using the stored simplified 3D environment data for at least some of the sectors of the 3D environment, and the audio source location and/or character location, a modification to be applied to the audio track in order to generate the modified audio signal; and generating the modified audio signal by applying the modification to the audio track, wherein the physics engine data comprises graphical mesh data and generating the simplified 3D environment data for the sector comprises: converting the physics engine data to a plurality of closed bounding boxes, each closed bounding box defining a size and a location of at least part of a physical feature in the computer generated 3D environment; inverting the closed bounding box data to generate open bounding box data that defines a plurality of open bounding boxes that each represent an empty space in the 3D environment; identifying open bounding boxes that are connected; and creating a record of connected open bounding boxes such that the record identifies a plurality of connected open bounding boxes that together make up an open bounding box connected network, wherein the simplified 3D environment data for the sector comprises the open bounding box data and the record of connected open bounding boxes, and wherein determining the modification to be applied to the audio track comprises: determining, using the stored simplified 3D environment data for at least some of the sectors of the 3D environment, an audio propagation path through the computer generated 3D environment between the audio source location and the character location; and determining the modification based at least in part on a length of the audio propagation path.

In a fourth aspect of the disclosure there is provided a computer program configured to perform the method of the third aspect when executed on at least one processor of an electronic device.

DESCRIPTION OF THE DRAWINGS

The patent or application file contains at least one drawing executed in color. Copies of this patent or patent application publication with color drawings will be provided by the Office upon request and payment of the necessary fee.

Aspects of the present disclosure are described, by way of example only, with reference to the following drawings, in which:

FIG. 8 is a block diagram of an exemplary computing device; and

DETAILED DESCRIPTION

The present disclosure relates to a system, software and method that, in real-time, determines how an audio track should be modified based on the physical features of a computer generated 3D environment. An audio signal to be output to a user controlling the character is then generated by applying the determined modification(s) to the audio track. Consequently, even if physical features of the 3D environment change in some way, for example because a user has changed the layout of a room in which the character is located or changes positions within the 3D environment, these changes should be detected and the audio track should be modified in a way that reflects the altered environment. In this way, audio realism within UGC 3D environments may be enhanced.

The inventors have achieved this by recognising that the properties of sound are typically dominated by large objects and coarse details, rather than by the fine detail that is required for visual and game-play realism. For example, a sound propagation path between an audio source and the character is primarily dependent on large features such as walls and openings in walls, rather than small details such as the fine contours or textures of small objects within the environment. As a result, the data representation of the 3D environment that is typically available from a physics engine may be simplified substantially so that it coarsely describes the physical features of the environment, without losing detail or information that would significantly affect the audio modification that should be applied. With this insight, the inventors have developed a technique where a simplified representation of the physical features of the 3D world is first generated using physics engine output data that describes features of the 3D environment. The modification(s) to be applied to the audio track are then determined using the simplified representation. By simplifying the representation, the physical features of the 3D environment are described by a significantly smaller dataset, which means that determination of the audio modification(s) may be performed more quickly and efficiently, thereby enabling real-time processing.

Figure 1:
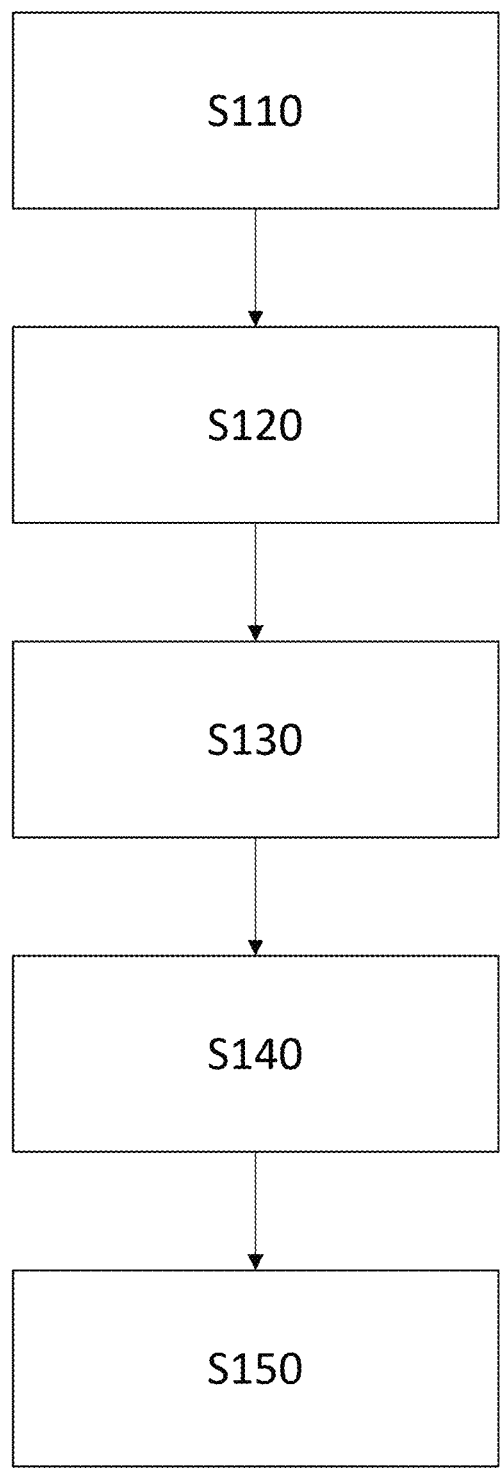
FIG. 1 shows an example representation of method steps performed in accordance with an aspect of this disclosure.

FIG. 1 shows a representation of steps of a process according to an aspect of the present disclosure. The steps of the process may be performed by a system, such as a computing system, that is configured to perform the process, or by executing a computer program on one or more processors in one or more computing devices. For example, a user may be operating a computing device (a client device) in order to interact with the computer generated 3D environment and control a computer generated character within the 3D environment. The entire process represented by FIG. 1 may be performed on the client device, for example by executing a computer program(s) on a processor(s) of the client device. Alternatively, it may be performed in part on the client device and in part on another device, for example a server with which the client device is in communication (for example, via the internet).

In Step S110, physics engine data is obtained. The physics engine data may include any type of data that can be output from a physics engine that is running to simulate the 3D environment. For example, the data may comprise mesh data that defines features of the computer generated 3D environment in which the user controlled computer generated character is located and/or collision data that defines the collision characteristics of objects within the 3D environment for the purpose of collision detection. The extent of the 3D environment described by the physics engine data may cover the entire virtual world in which the character is located, or (more commonly) an area surrounding the character's location since the entire virtual world may be extremely large. The physics engine data may be obtained from any suitable location or software module, for example they may be obtained from memory, or directly from a physics engine such as CHAOS, or PhysX. The collision engine data may comprise data that define features in the 3D environment in a number of different ways. For example, the data may comprise collision data and/or graphical data. As such, the physics engine data may comprise mesh data, or trimeshes, which as the skilled person will readily appreciate define the physical features of the 3D environment using a series of triangles arranged to form meshes (for example, providing a very detailed definition of the size, shape, contours, location, etc, of physical features such as buildings, walls, objects, etc within the 3D environment). Additionally or alternatively, the physics engine data may comprise bounding box data providing a fairly detailed definition of the size, shape and location of physical features, for example for the purpose of collision detection.

In Step S120, an audio track is obtained. The audio track is associated with an audio source that is positioned at an audio source location within the computer generated 3D environment. For example, the audio track may be a piece of music that should be output to the user controlling the character in order to simulate music being play from a speaker (the audio source) in the 3D environment, or may be noise that should be output to the user controlling the character in order to simulate the operation of a machine such as an air conditioning unit (the audio source) in the 3D environment, or may be a reactive sound just as doors opening, explosions, gun fire, etc. The audio track may be obtained from any suitable location or software module, for example it may be obtained from memory, or from an audio player, or may be attached to the associated object defined in the physics engine data.

In Step S130, the physics engine data is used to generate simplified 3D environment data. The simplified 3D environment data comprises a simplified representation of physical features of the 3D environment. Details of ways in which the simplified 3D environment data may be generated are given later in this disclosure. The physical features described by the simplified 3D environment data may be the same as those described by the physics engine data, or may be a sub-set (for example because small or insignificant physical features may be omitted, or combined and described by a simplified, merged feature).

In Step S140, the simplified 3D environment data is used to determine a modification to be applied to the audio track in order to generate a modified audio signal that is to be output to the user. Further details of this step are given later in this disclosure. The simplified 3D environment data may affect the modification to be applied to the audio track in many different ways. For example, it may be used to determine an audio propagation path between the audio source location and the character location, which may be used to set the volume attenuation and/or filtering to be applied to the audio track. Additionally or alternatively, it may be used to determine properties of the environment in which the character is located, such as whether they are indoors or outdoors and/or the size of a room they are in and/or the ceiling height of the room they are in and/or the predominant material in the room they are in, etc, all of which may be used to set the reverb modification to be applied to the audio track.

Finally, in step S150, a modified audio signal is generated by applying the determined modification(s) to the audio track when output to the user. For example, the modification may comprise any one or more of: a volume coefficient (for example, an attenuation value between 0 and 1 that is used to adjust the amplitude of the audio signal output to the user); a high-pass filter coefficient; a low-pass filter coefficient; a reverb coefficient that affects the level and nature of reverb applied to the audio signal. The audio signal may be a digital audio signal (i.e., a digital representation of the audio signal to be played to the user), in which case it may be generated by applying, in the digital domain, the modification to a digital representation of the audio track. In this case, Step S150 (optionally in addition to any one or more of steps S110-S140) may be performed on a server device, subsequent to which the modified audio signal may be sent to the client device to be played out to the user. Alternatively, Step S150 (optionally in addition to any one or more of steps S110-S140) may be performed on the client device.

Additionally or alternatively, the modified audio signal may be a voltage signal that is output to a speaker that is coupled (wired or wirelessly) to the client device, or may be the sound signal that is output by a speaker. In this case, generating the modified audio signal may comprise applying, in the digital domain, the modification to a digital representation of the audio track and then converting the modified digital audio signal to an analog voltage signal, or it may comprise applying the modification to an analog representation (for example, a voltage signal) of the audio track. The skilled person will readily appreciate how modifications such as volume, frequency filtering and/or amount/type of reverb can be applied to an audio track in order to generate a modified audio signal and so will not be described any further herein.

The method may further comprise playing the modified audio signal to the user as a sound wave/signal that is output/played to the user.

Generating the Simplified 3D Environment Data

The simplified 3D environment data is a smaller set of data than the physics engine data. It describes physical features of the 3D environment in a simpler, coarser way that than of the physics engine data. Typically, the simplified 3D environment data will define characteristics of physical features that may affect the audio properties of the environment around the character, for example the position and approximate size and shape of walls, floors, ceilings and other relatively large objects, without also including the finer details that are part of the first 3D environment data, such as the fine shape, contours and textures of the physical features of the 3D environment. The simplified 3D environment data may be generated in a variety of different ways depending, for example, on the nature and content of the physics engine data, and the desired size of the simplified 3D environment data (which might depend, for example, on the expected computing power of the device on which step S140 is to be performed and/or the extent to which the computing power of the device is likely to be required for running other aspects of the computer generated 3D environment). In one example, generating the simplified 3D environment data involves identifying surfaces of objects described in the physics engine data and then approximating each identified surface with one or more bounding boxes (for example, axis aligned bounding boxes, AABBs), ideally with the minimum possible number of bounding boxes. For example, a wall in the first 3D environment may be defined by a mesh comprising a large number of triangles (for example, 1000s of triangles) in the physics engine data. However, in the simplified 3D environment data it may be represented by a single AABB, which requires a considerably smaller amount of data than the mesh of triangles. Some non-limiting detailed examples of how the simplified 3D environment data may be generated are given below.

Before going into those examples, it is worth setting out a brief explanation of the terminology "real-time". The present disclosure is concerned with enabling the process represented in FIG. 1 to be performed in real-time. This means that it may be performed whilst the user is interacting with the computer generated 3D environment, for example whilst they are controlling the computer generated character within the 3D environment. This means that when the character enters a new environment, for example a new building, or a new landscape/region, of a 3D environment that is user generated (eg, was not built into the 3D environment at the time of original software development), the audio experience of the user should be consistent with the physical features of the 3D environment, without any perceptible lag (eg, they should not be able to perceive in lag between entering an environment and the audio experience adapting to the environment). Likewise, if there are any changes to the 3D environment whilst the user is interacting with it, there should not be any perceptible lag between the change in environment and the corresponding change in audio experience.

To achieve this, the steps represented in FIG. 1 may be regularly repeated, periodically or intermittently, with sufficient frequency that changes in the 3D environment represented by the physics engine data have the potential to alter the audio signal output to the user (for example, if the changes are sufficient enough to affect the audio properties of the 3D environment). Alternatively, a flag may be automatically generated upon modification of the 3D environment that instructs the steps of FIG. 1 to take place again to account for changes to the 3D environment.

This does not mean that the steps must be repeated for the entire 3D environment every frame. For example, the 3D environment may be divided into sectors or area, for example into four, eight, 16, etc sectors. This may be performed at Step S110 (for example, physics engine data may be obtained for only a sector of the 3D environment), or at S130 (for example, the portion of the physics engine data defining physical features in a sector of the 3D environment may be identified and then used to generate the simplified 3D environment data). Once the simplified 3D environment data for one sector is determined, the system may then determine the simplified 3D environment data for the next sector. This may be repeated across the entire 3D environment until the simplified 3D environment data defines the physical features of the entire 3D environment, at which time the system may return to the first sector of the 3D environment and repeat Step S130 for that first sector, so that any changes to that sector can be identified and then reflected in the simplified 3D environment data. In this way, Steps S140 and S150 may be regularly repeated using the simplified 3D environment data for the entire 3D environment (for example, every frame, eg every 0.02 second in a 50 Hz system), with the simplified 3D environment data being regularly refreshed so that it quickly picks up any changes in the physics engine data. The refresh regularity (for example, the frequency with which the system returns to a region of the 3D environment to recalculate the simplified 3D environment data) should be sufficient for there to be no perceptible lag between a change in the 3D environment and a corresponding change in the audio signal, which may depend on design choice. For example, it may be that each sector of the 3D environment needs to be refreshed at least once every second, or at least once every 0.5 seconds, or at least once every 0.2 seconds, etc. Therefore, performing the method disclosure herein in "real-time" does not mean that changes in the 3D environment defined by the physics engine data instantaneously affect the audio signal, but rather mean that they affect the audio signal with a lag that is imperceptible to the user, which typically means that they affect the audio signal within one second.

Figure 2:
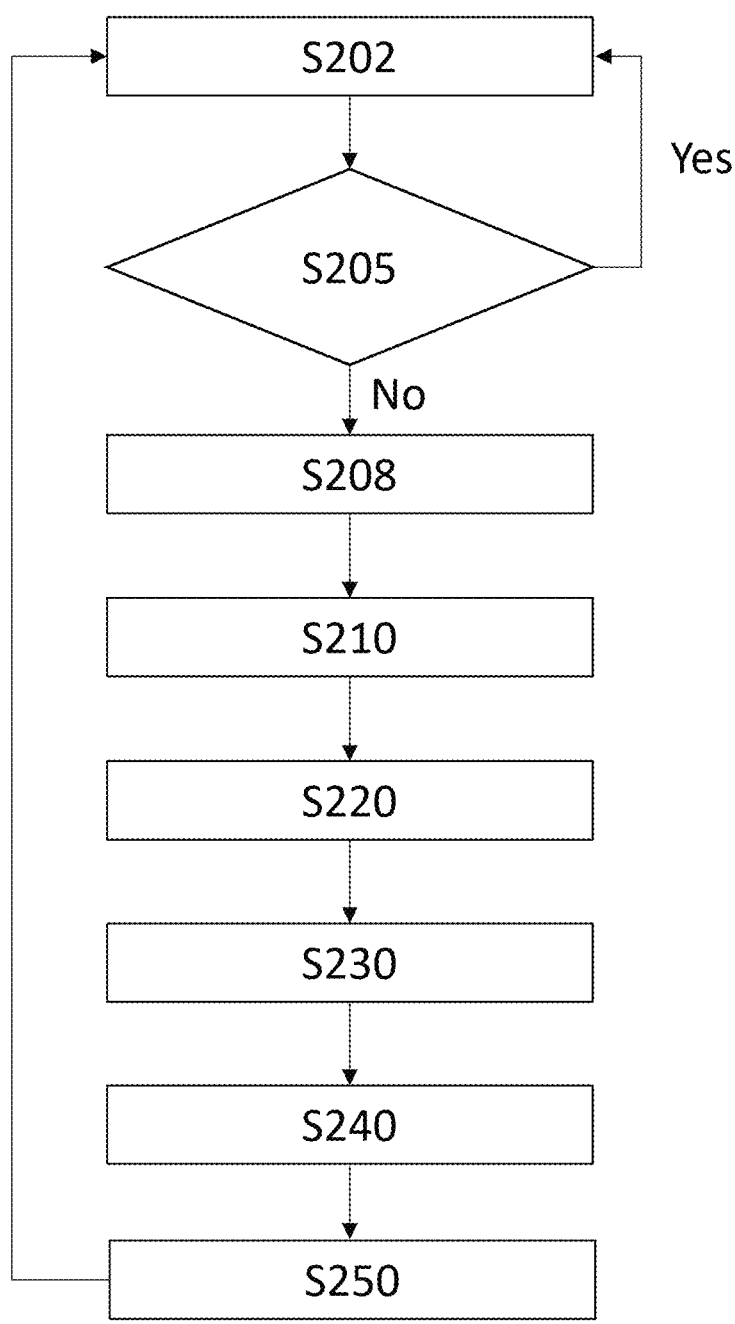
FIG. 2 shows an example representation of some processes that may be performed as part of the method steps represented in FIG. 1.

FIG. 2 shows some example process steps that may be performed in order to generate the simplified 3D environment data. The purpose of these steps is to take the physics engine data describing the 3D environment and create simplified 3D environment data that represents a generalised, simplified representation of objects (i.e. physical features) in the 3D environment, thus reducing the amount of data that must be analysed or processed in Step S140.

Steps S202, S205 and S208 are optional steps that may be performed to enhance the efficiency of generation of the simplified 3D environment data.

In Step S202, a hash, or other similar unique fingerprint, of at least part of the obtained physics engine data is determined. The skilled person will readily understand how to hash data and so further explanation of that process will not be provided herein. The hashed physics engine data may be the data defining the entire 3D environment defined by the physics engine data, in which case the entire data set may be hashed, or the hashed physics engine data may relate just to the sector of the 3D environment that is being worked on at that time, in which case the hash will be of physics engine data relating to just that sector.

In Step 205, the hash that is determined in Step S202 is compared with a stored physics engine data hash to see if they are the same. The stored physics engine data hash relates to the same part of the 3D environment that is defined by the physics engine data that was hashed in Step S202. If the two hashes are the same ("yes" in FIG. 2), then there has been no change in that part of the 3D environment and it is not necessary to go through the steps of computing the simplified 3D environment data again. Instead, simplified 3D environment data for that part of the 3D environment that was generated at the same time as the stored hash may be used and the process can return to Step S202, which will then be repeated for the next sector of the 3D environment (or if the physics engine data defining the entire 3D environment is hashed each time, then Steps S202 and S205 will effectively be repeated until some change is made to the physics engine data). In this way, the physical features of the 3D environment may be continually monitored until there is a change. It will be appreciated that if this is the first time the process of FIG. 2 is being performed, there will be no stored hash so the decision at Step S205 would be "no".

If Step S205 identifies that the hash determined in Step S202 is not the same as the stored hash ("no" in FIG. 2), then the process proceeds to Step S208. In Step S208, the stored hash is updated with the hash that was determined in Step S202.

In Step S210, at least some of the objects defined by the physics engine data are simplified into bounding boxes, such as AABBs. The physics engine data may comprise collision data (which the skilled person will readily understand), for example marking some objects as collision objects and others as non-collision objects. The non-collision objects may be ignored in the process of generating bounding boxes that approximate objects, so that the simplified 3D environment data may describe only collision objects. Typically, non-collision objects are insignificant objects from an audio perspective, since they are not significant or large enough to warrant a collision. Alternatively, objects of below a threshold volume (whether user created or built into a given game), may automatically be flagged as not relevant in the audio propagation calculations and may be excluded from any simplification. The flagging of non-considered objects may be the same or different from no-collision objects.

There are many different ways in which data (for example, meshes and/or bounding boxes) in the physics engine data may be converted into simple bounding boxes. For example, as the skilled person will understand, a mesh describing an object surface can be identified. A bounding box can be used to approximate at least part of the surface, for example by sizing the box so that at least one of the box surfaces is always within a predetermined distance of the mesh surface (the predetermined distance being configurable according to how coarsely the objects in the 3D environment are to be approximated). In this way, if an object has a relatively smooth or slow changing surface texture, for example a relatively flat wall or a large cylinder, it may be approximated by a single bounding box. If the surface has very fast changing contours, it may be approximated by a plurality of adjoining bounding boxes, each bounding box approximating a part of the surface.

Alternatively, a bounding box can be used that is effectively rectangular on each of its faces, but that also encompasses or bounds the entirety of a given object or objects may be one way in which the environment is simplified. Still further alternatively, a collision box (e.g. "hit box") may be used as a surrogate for objects which are of sufficient size to merit consideration for transformation of audio sources. Typically such "hit boxes" are significantly simplified for a given object, if it is complex. And, in general, even in 3D environments that rely upon user-generated content, the building blocks of that content tend to have pre-defined hit boxes. Still further alternatively, the system may calculate an estimated volume for a given object or objects for which the bounding boxes are created. A rectangular bounding box of this volume may be roughly-placed within the 3D environment at or near the location of the object to act as a simplification of the complex 3D environment. Still further alternatively, meshes for the environment may be smoothed using anti-aliasing techniques or similar techniques devised to enable variable model complexity for purposes of rendering 3D models are higher or lower fidelity for computing devices having different capabilities. An extremely-low-fidelity model may be used in place of the 3D environment components as a "bounding box" for audio manipulation purposes. These and other possibilities for simplification of one or more objects in a 3D environment may be used.

Figure 3A:
FIG. 3A shows an example visualisation of a 3D environment.

FIG. 3A shows an example visualisation of a 3D environment. This example visualisation is generated, at least in part, using physics engine data and includes a lot of visual detail for the 3D environment.

Figure 3B:
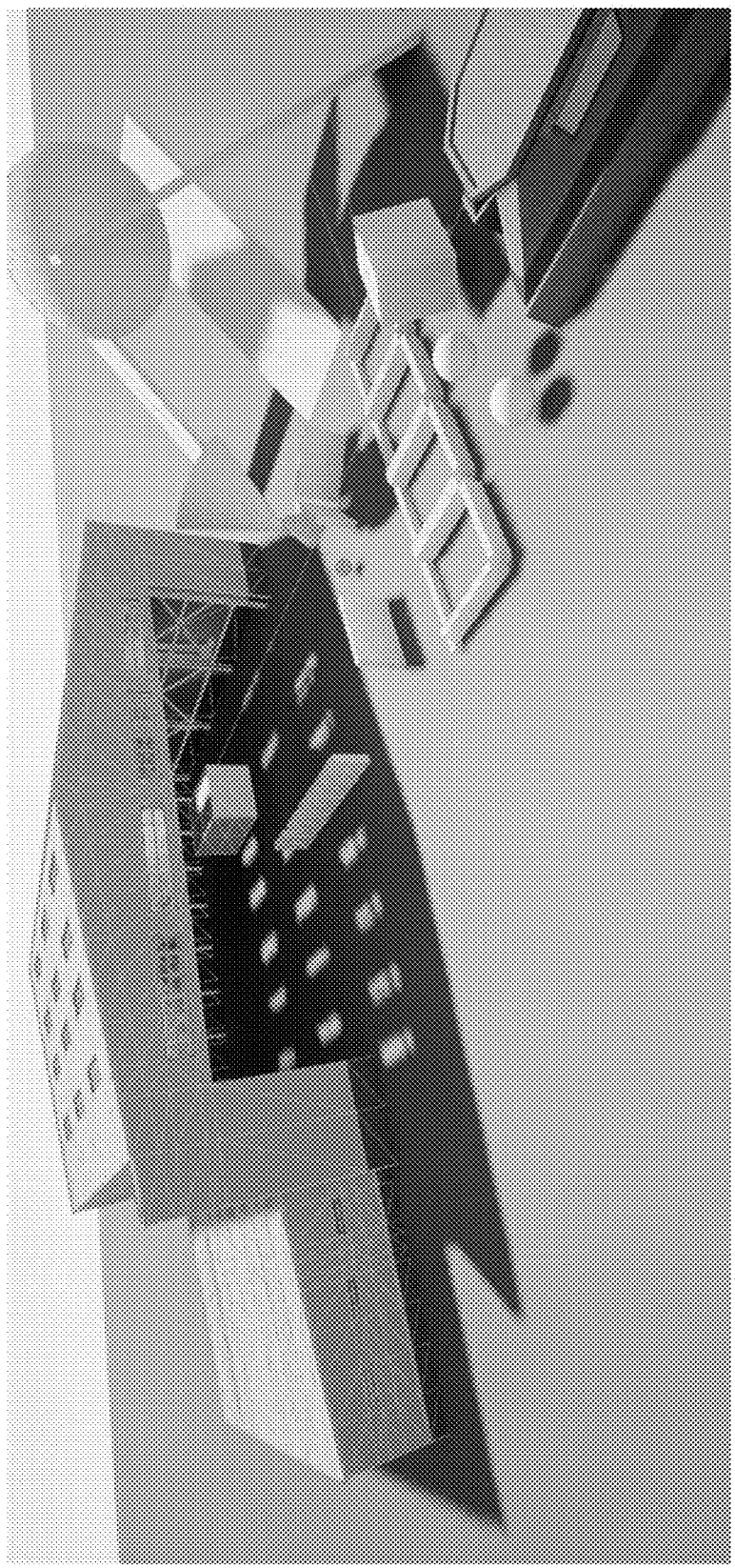
FIG. 3B shows the 3D environment of FIG. 3A overlayed with mesh data defining features of the 3D environment.

FIG. 3B shows an example visualisation of the 3D environment of FIG. 3A, but from a different perspective. In this example, mesh data defining features of the 3D environment is overlayed on the visualisation.

Figure 4A:
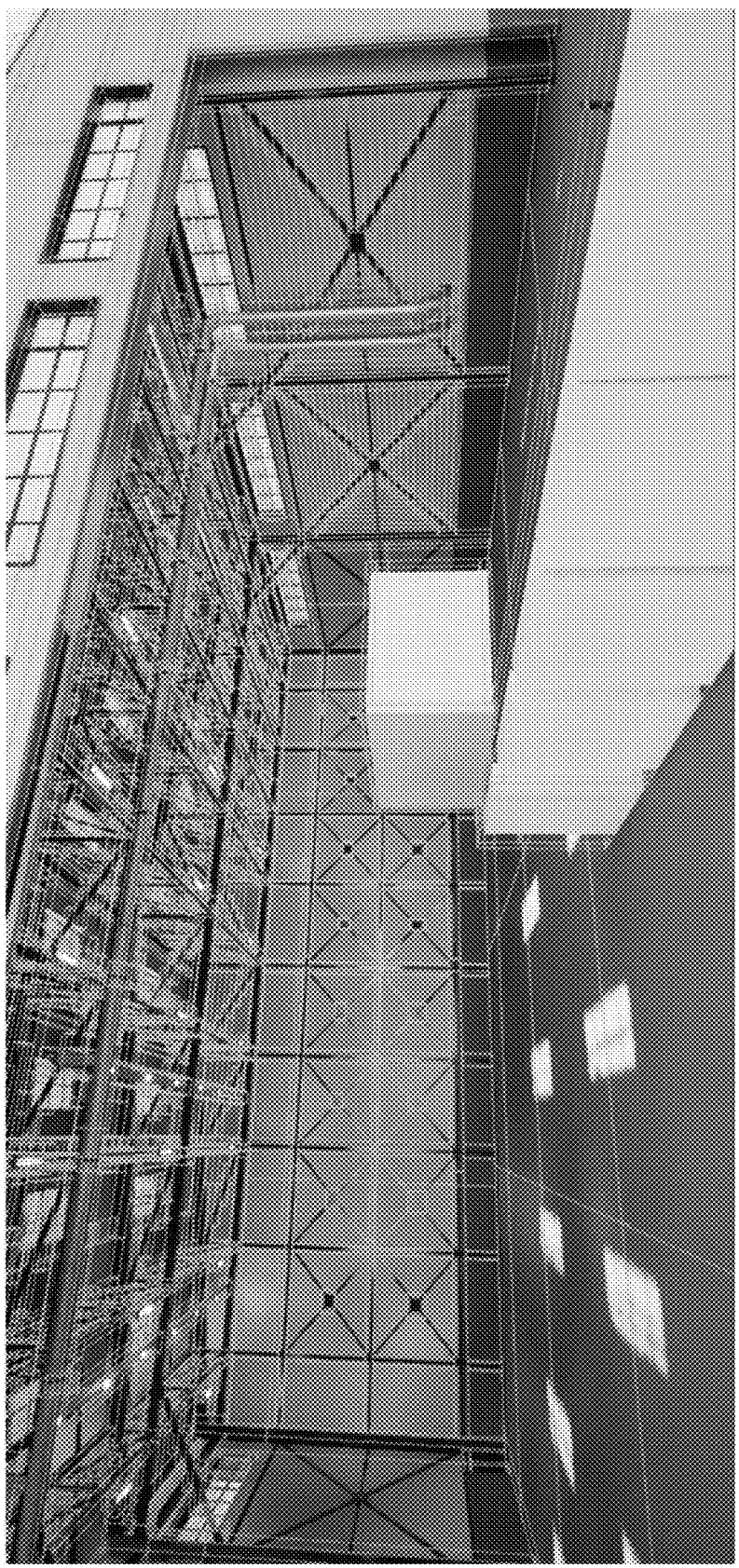
FIG. 4A shows a further visualisation of the 3D environment of FIG. 3A, overlayed with closed bounding boxes defining features of the 3D environment.

FIG. 4A shows an example visualisation of the 3D environment of FIG. 3A, but from a different perspective, with an overlay of closed set bounding boxes that have been generated in Step S210 to approximate objects within the 3D environment.

Figure 4B:
FIG. 4B shows a visualisation of just the closed bounding boxes of FIG. 4A.

FIG. 4B shows a visualisation of just the closed bounding box set. The bounding box approximations of objects in FIGS. 4A and 4B are considerably simplified representations and, as such, the size of data defining the bounding boxes should be significantly smaller than the size of the physics engine data.

Step S220 is an optional step where the bounding box data, which describes where objects are located, is inverted to create bounding box data that describes where there is an absence of objects within the 3D environment. The bounding box data that describes where objects are may be referred to as the closed bounding box set (i.e., each bounding box is a "closed bounding box"), and the inverted bounding box data that describes where there is an absence of bounding boxes may be described as the open bounding box set (i.e., each bounding box is an "open bounding box"). The open bounding box set may be useful for processes where there is not a direct line of sight between the character location and the audio source location (as described later).

Figure 5A:
FIG. 5A shows a further visualisation of the 3D environment of FIG. 3A, overlayed with open bounding boxes defining where there is an absence of objects in the 3D environment.

FIG. 5A shows an example visualisation of the 3D environment of FIG. 3A, but from a different perspective, with an overlay of open bounding boxes that have been generated in Step S220 to define where in the scene that is an absence of objects.

Figure 5B:
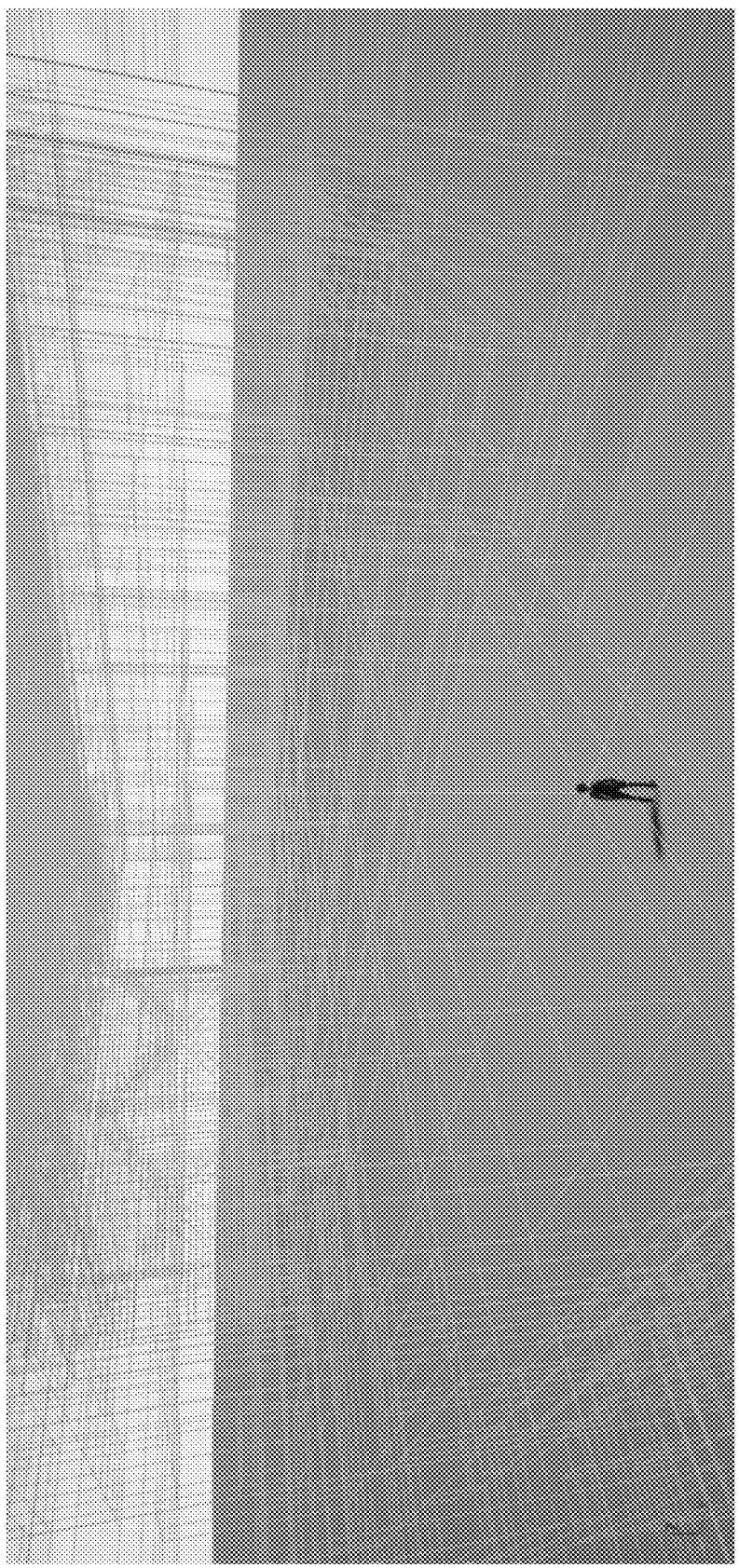
FIG. 5B shows a visualisation of just the closed bounding boxes of FIG. 5A.

FIG. 5B shows a visualisation of just the open bounding boxes.

Step S230 is a further optional step of computing octrees for the bounding box data. If Step S220 is not performed, then Step S230 may compute octrees for the closed bounding box set arrived at by Step S210. If Step S220 is performed, then Step S230 may compute octrees for the closed bounding box set and/or the open bounding box set. The skilled person will readily understand what octrees are and how to compute them, and so they shall not be described further herein. The octrees may be used for processes in generating the simplified 3D environment data and/or for determining the modification to be applied to the audio track in Step S140, for example in ray tracing as described later.

Step S240 is a further optional step of computing the connectivity of the generated open bounding boxes. For example, a series of connected open bounding boxes may represent an open path through the 3D environment, through which sound, for example, may travel. Two open bounding boxes that do not have any adjoining surfaces, for example because they are separated by a closed bounding box (for example, a wall), would not be identified as connected. It may reasonably be assumed that sound cannot travel from one open bounding box to another unconnected open bounding box.

The connectivity of bounding boxes may be identified and recorded in any suitable way. One example way in which connected bounding boxes may be identified is by creating a slightly enlarged, or inflated, copy of each of the open bounding boxes. For example, the open bounding boxes may each be enlarged by 1%, or 2%, or 3%, in every dimension. The enlarged bounding boxes may then be intersected with the open set octrees determined in Step S230. From the intersection, connected (i.e., neighbouring/adjacent/abutting/adjoining) open bounding boxes may be identified. Each bounding box may have a unique identifier or address (for example, a unique number) and for each bounding box a record of the identifier/address of all connected bounding boxes may be stored in memory. By doing so, a record of a network of connected open bounding boxes is created such that the connectivity of all open bounding boxes can be understood and tracked. This may be useful for processes in Step S140, for example in determining whether or not an audio track associated with an audio source should be heard at all by the user (for example, by starting from the open bounding box in which the audio source (or character) is located and determining if it is possible to traverse through connected open bounding boxes to the open bounding box in which the character (or audio source)) and for quickly and efficiently determining a propagation path between the audio source and character.

In Step S250, the determined simplified 3D environment data is stored, and will replace any previously determined and stored simplified 3D environment data for that sector/part of the 3D environment. The stored simplified 3D environment data may comprise any one or more of: the closed bounding box set; the open bounding box set; the closed octrees; the open octrees; the connectivity data for the open bounding boxes.

The process then returns to Step S202, where the next sector of the 3D environment defined by the physics engine data is then considered. The steps of the process of FIG. 2 are then repeated until all sectors of the 3D environment have been considered so that there is stored simplified 3D environment data representing the physical features of the entire 3D environment. Once all sectors have been considered, the process may return back to the first sector and repeat the entire process again. In this way, the entire 3D environment may be efficiently monitored for changes and, when a change has been detected in Step S205, the simplified 3D environment data may be updated based on the changed environment. In practice, changes to the 3D environment may be relatively rare, so it may be expected that Steps S208 to S250 are only intermittently required, and most likely only in relation to one or two sectors of the 3D environment at any given time. Therefore, by dividing the 3D environment into sectors and using hashes to determine whether or not a change has occurred in each sector since the simplified 3D environment data was last determined for that sector, the process of generating and maintaining the simplified 3D environment data according to this disclosure may be very efficient. As a result, any changes in the 3D environment may be quickly identified and reflected in the simplified 3D environment data, so that they may, in real-time, have an effect on the modified audio signal that is output to the user.

Whilst FIG. 1 shows a linear, step by step process, it will be appreciated that Steps S210, S220 and S230 may effectively be performed in a continual loop in order to maintain up-to-date simplified 3D environment data, and Steps S240 and S250 may effectively be performed in a parallel continual loop. In particular, Steps S210, S220 and S230 may be performed by a software module or routine, which may be referred to as a simplified 3D environment data generation module or environment simplification system, which ensures that continually updated simplified 3D environment data is stored. Steps S240 and S250 may be performed in parallel by a different software module or routine, which may be referred to as an audio analysis and modulation module or audio propagation software, with the processes of Step S240 working from the latest simplified 3D environment data that has been stored by the simplified 3D environment data generation module and Step S250 may utilise the outcomes of Step S240.

Determining the Modification to be Applied to the Audio Track

There are various different types of audio track modification that may be determined using the simplified 3D environment data in Step S140. Various examples are explained below and in summary, the modification(s) may be determined by identifying an audio propagation path through the 3D environment and/or by determining environmental data indicative of at least one audio property of the 3D environment.

Figure 6:
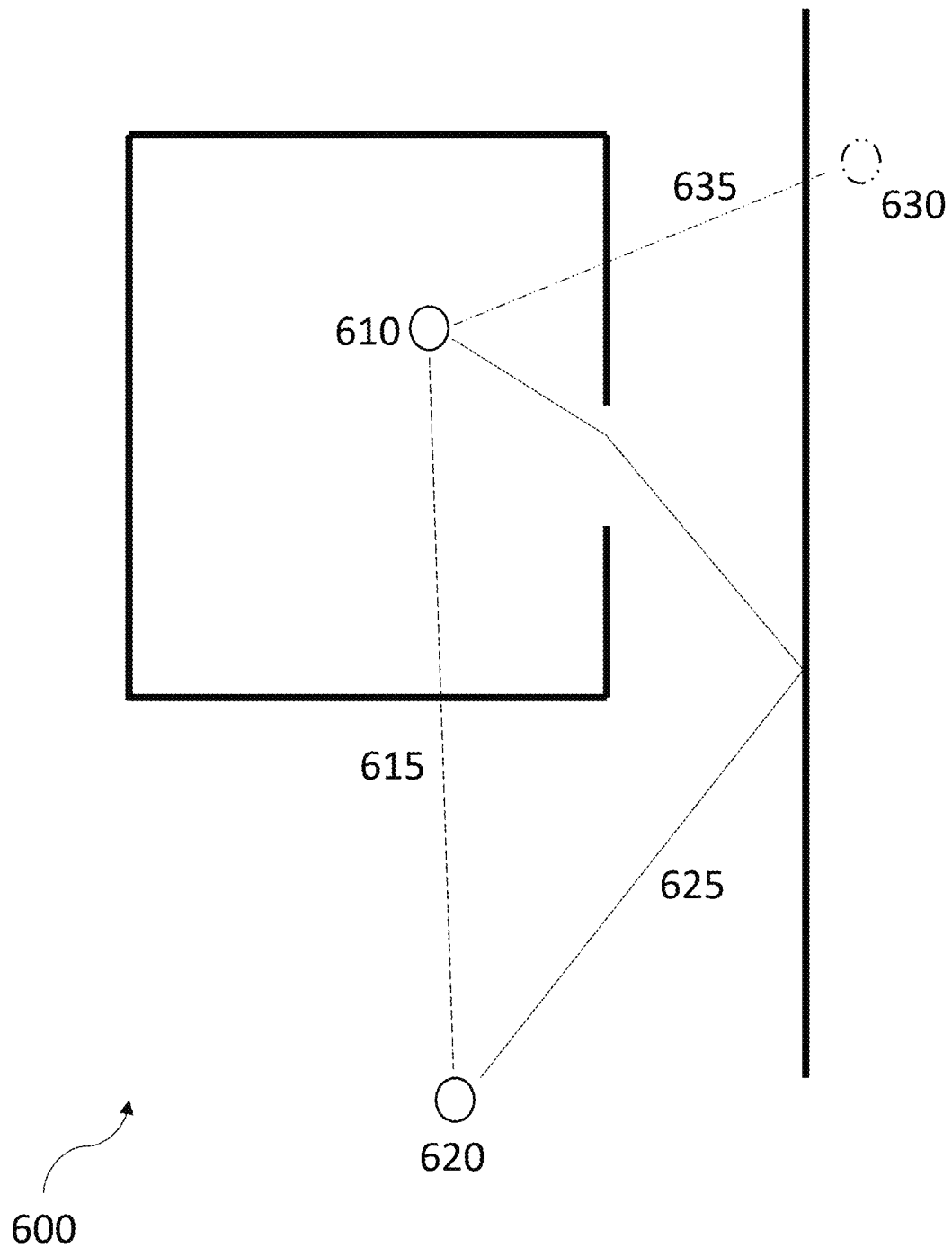
FIG. 6 shows an example top-down plan for a 3D environment, showing an audio propagation path between an audio source and a character.

FIG. 6 shows a top-down view of a 3D environment 600 to assist in understanding the determination of an audio path through the 3D environment. Within the 3D environment is an audio source at an audio source location 610 and a character at a character location 620. The audio source location 610 is within a walled room that has an opening on it's right hand side. The audio source location 610 and character location 620 are at a straight line, direct distance 615 from each other. However, as can be seen in FIG. 6, in this example the straight line direct path 615 passes through a wall and so does not represent the path that sound would take. An audio propagation path 625 may be determined by applying any suitable path finding algorithm (such as the A* path finding/search algorithm, which will be well known by the skilled person) to the simplified 3D environment data. For example, if the simplified 3D environment data includes an open bounding box set (and preferably also connectivity information for the open bounding boxes, since this will quickly reveal if the audio source and character are within the same open bounding box network, and exactly which open bounding boxes are between the audio source and character), the path finding algorithm may be applied straightforwardly and efficiently just to the open bounding boxes, such that the shortest path 625 between the audio source location 610 and character location 620 can be quickly determined. If no path can be found, for example because there is no open space path between the audio source location 610 and character location 620 (or the audio source location 610 and character location 620 are not within the same open bounding box connected network, if connected networks have been determined), then the path finding algorithm should determine that the sound from the audio source is fully obstructed. In the example of FIG. 6, it can be seen that a path 625 is found, which includes a reflection off a wall and the passing through an opening in another wall.

In one example, it may first be determined, for example from the closed bounding box set, whether or not there is a direct line of sight between the character location 620 and the audio source location 610. If there is, then the audio propagation path 625 is the same as the straight line direct path 615, which can be determined extremely quickly without requiring an open bounding box set. If it is determined that there is not a direct line of sight between the character location 620 and the audio source location 610, the open bounding box set may be used to determine the audio propagation path 625 (optionally, step S220 may only be carried out to determine the open bounding box set in the event that there is not a direct line of sight, or step S220 may be performed in advance and stored so that the open bounding box set is available for use during audio track modification determination).

Optionally, a virtual location 630 for the audio source may be determined based on the audio path 625. The virtual position 630 is a position anywhere within the 3D environment, or even outside of the 3D environment (for example, beyond the limits of the 3D environment that has been rendered at a given moment), that would better replicate the audio experience of the audio source given the physical properties of the 3D environment. For example, in the case of FIG. 6, the audio propagation path 625 is longer than the straight line direct path 615, and includes a reflection off a wall and a refraction through an opening. Therefore, sound from the audio source 610 would appear at the character's location 620 to be coming from a different direction and from further away than if there were a direct audio path between the audio source location 610 and the character location 620. If the audio source were moved to the virtual location 630 and the modified audio signal were generated from the audio track by treating it as though there were a direct audio path from the virtual location 630 to the character location 620, the audio experience of the user would be more realistic. The virtual location 630 may be determined in many different ways, for example based on any one or more of the length of the audio path 625, and/or a ratio of the length of the audio path 625 and the length of the straight line direct path 615, and/or an average angle of the audio path 625. The average angle of the audio path 625 may be determined by, for each unit length of the audio path 625, measuring an angle of the unit length of path relative to a reference line (for example, a line that goes from the bottom to the top of the page of FIG. 6) and finding the average of those angles. The virtual position distance 635 may be set based on the length of the audio path 625, and/or a ratio of the length of the audio path 625 and the length of the direct path 615, and the direction of the virtual position 630 relative to the character position 620 may be set using the determined average angle of the audio path 625.

The determined audio path 625 between the audio source location 610 and the character location 620 may be used in one or more ways to determine one or more different types of audio track modification. For example, it may be used to determine a volume attenuation to be applied to the audio track and/or to determine at least one coefficient for a low-pass filter through which the audio track is passed and/or to determine at least one coefficient for a high-pass filter through which the audio track is passed (and/or to determine at least one coefficient for a band-pass filter through which the audio track is passed, which the skilled person will know is effectively a combined low and high pass filter).

For example, one or more runtime parameter controls (RTPCs) relating to the volume setting and/or low-pass filter settings and/or high-pass filter settings, may be adjusted by a modification amount that is determined using at least the identified audio path 625.

For example, the RTPCs may include one or more of the following:

AP_ObstructionFactor[0 or 1]. This RTPC is a binary 0 or 1, which is set to 0 if no audio path can be found, and 1 if an audio path can be found. In this way, the audio track may be modified to have zero amplitude if no path is found (in which case no audio signal would be heard by the player) and may be unmodified by this RTPC if an audio path is found.

AP_PathLengthMeters[0/L]. This RTPC uses the length of the audio path 625 in meters, which can be between the minimum, 0 metres, and the maximum L meters (for example 100 metres or 200 meters). In the volume example, the longer the length of the audio path 625, the more attenuation may be applied to the audio track to generate the modified audio signal. For example, the RTPC may set the attenuation to a value of 1-1/L, where 1 is the determined path length. In this case, if 1 is very short, very little attenuation will be applied (it will be a value close to 1) and if 1 is very long, a large amount of attenuation will be applied (it will be a value close to 0). This is merely one non-limiting example and many different types of attenuation curves, for example non-linear attenuation curves, may instead be used.

AP_PathLength_Ratio [0/R]. This RTPC uses a ratio of the length of the straight line direct path 615 and the length of the audio path 625, between a minimum value 0 (for example, the direct path 615 is the same as the audio path 625) and a maximum allowable ratio R, for example 5, or 10 or 20 (i.e., the length of the audio path is 5, or 10, or 20 times longer than the direct path 615). This RTPC may be set up, for example, to attenuate the volume more the larger the ratio is.

AP_VirtualPositionOffset [0/V]. This RTPC uses the distance 635 between the audio source location 610 and the virtual location 630 in meters, between a minimum, 0 metres, and a maximum V metres (for example, 100 metres or 200 metres, etc). In the volume example, the further the distance 635 between the audio source location 610 and the virtual location 630, the more attenuation may be applied to the audio track to generate the modified audio signal. For example, the RTPC may set the attenuation to a value of 1-v/V, where v is the distance 635. In this case, if v is very small, very little attenuation will be applied (it will be a value close to 1) and if v is very large, a large amount of attenuation will be applied (it will be a value close to 0). This is merely one non-limiting example and many different types of attenuation curves, for example non-linear attenuation curves, may instead be used.

These are merely some examples of how the modification to the audio track may be determined based on the audio propagation path 625. In an alternative, the virtual location 630 may be input to an audio attenuation curve, rather than the audio source location 610. As the skilled person will understand, audio attenuation curves may set coefficients for at least one of: volume attenuation; low pass filtering; and/or high pass filtering (which includes band-pass filtering). Therefore, by changing the position of the audio source to the virtual location to better reflect the distance the audio would actually travel through the 3D environment, the coefficients output from the attenuation curve may result in the modified audio signal giving a more realistic audio experience for the user.

Additionally or alternatively to determining audio path propagation, the modification(s) to be applied to the audio track may be determined based on at least one environmental property at the audio source location 610 and/or the character location 620. The at least one environmental property may be any one or more of: whether the character location 620 is in an indoor or outdoor environment; whether the audio source location 610 is in an indoor or outdoor environment; the size of a space (for example, a room) that the character location 620 is in; the size of a space (for example, a room) that the audio source location 610 is in; the dominant material in a space (for example, a room) that the character location 620 is in; and/or the dominant material in a space (for example, a room) that the audio source location 610 is in. Whilst any one or more of these properties relating to the audio source location 610 may be determined and have an effect on the modification(s) to be applied to the audio track, typically the inventors have realised that the one or more properties relating to the character location 620 may be more important for creating a more realistic audio experience, so more usually one or more of the environmental properties relating just to character location 620 will be determined.

Whether or not the audio source location 610 and/or character location 620 is indoors or outdoors may be determined, for example, by using vertical ray traces. For example, within the 3D environment described by the simplified 3D environment data, Step S140 may include tracing a plurality of vertical ray traces, each trace being at a different location within the 3D environment. As the skilled person will apricate, ray traces stop when they encounter an object (for example a bounding box). Vertical ray traces that return no result, or return a distance that exceeds a predetermined threshold, may be understood to indicate that that part of the 3D environment is outdoors. Vertical ray traces that return any distance, or return a distance that is less than the predetermined threshold, may be understood to indicate that that part of the 3D environment is indoors. The vertical ray traces may cover an area that extends around the audio source location 610 (if it is desired to know whether the audio source is indoors or outdoors) or an area that extends around the character location 620 (if it is desired to know whether the character is indoors or outdoors). The area over which the vertical ray traces extend may be at least part of the network within which the audio source or the character is located. For example, if the simplified 3D environment data includes open bounding box connectivity data, the vertical ray traces may be distributed around the open bounding box connected network within which the audio source or character is located. Within that connected network, the ray vertical traces may cover an area that extends only a predetermined distance from the audio source location 610 or character location 620 and there may be a fixed maximum number of vertical ray traces (for example, 500, or 1000, or 5000, or 10000, etc) set at predetermined distances from each other. In this way, the vertical ray traces may be used to give a good understanding of the environment within which the audio source or character is located, without requiring a large amount of computing if the space is very large. Optionally, the indoor/outdoor status determined using the vertical ray traces may be indicative of the amount by which the audio source or character may be considered to be in an indoor or outdoor environment. For this, the determined environment data may include the ratio of the number of "indoor" ray traces vs the number of "outdoor" ray traces, and this ratio may determine the extent to which the audio source or character may be considered to be indoors or outdoors. By making an assessment in this way, if the character is for example within an indoor space but very close to an opening into an outdoor space, the audio track modification determined from the environment data should reflect the fact that as far as audio experience goes, the character is effectively within a partially indoor, partially outdoor environment.

Figure 7A:
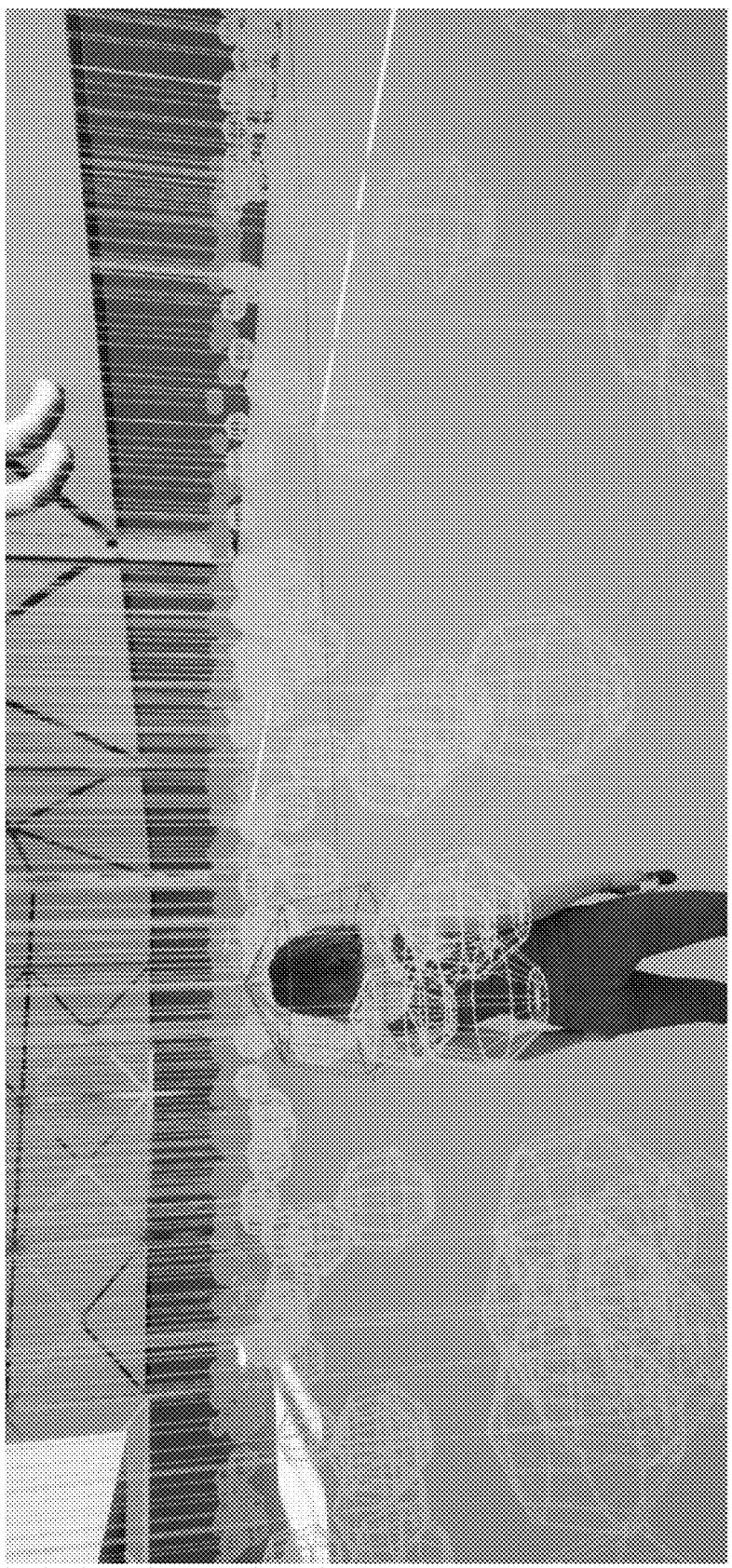
FIG. 7A shows an example visualisation of vertical ray traces within a 3D environment.

FIG. 7A shows an example visualisation of vertical ray traces that within the 3D environment.

Figure 7B:
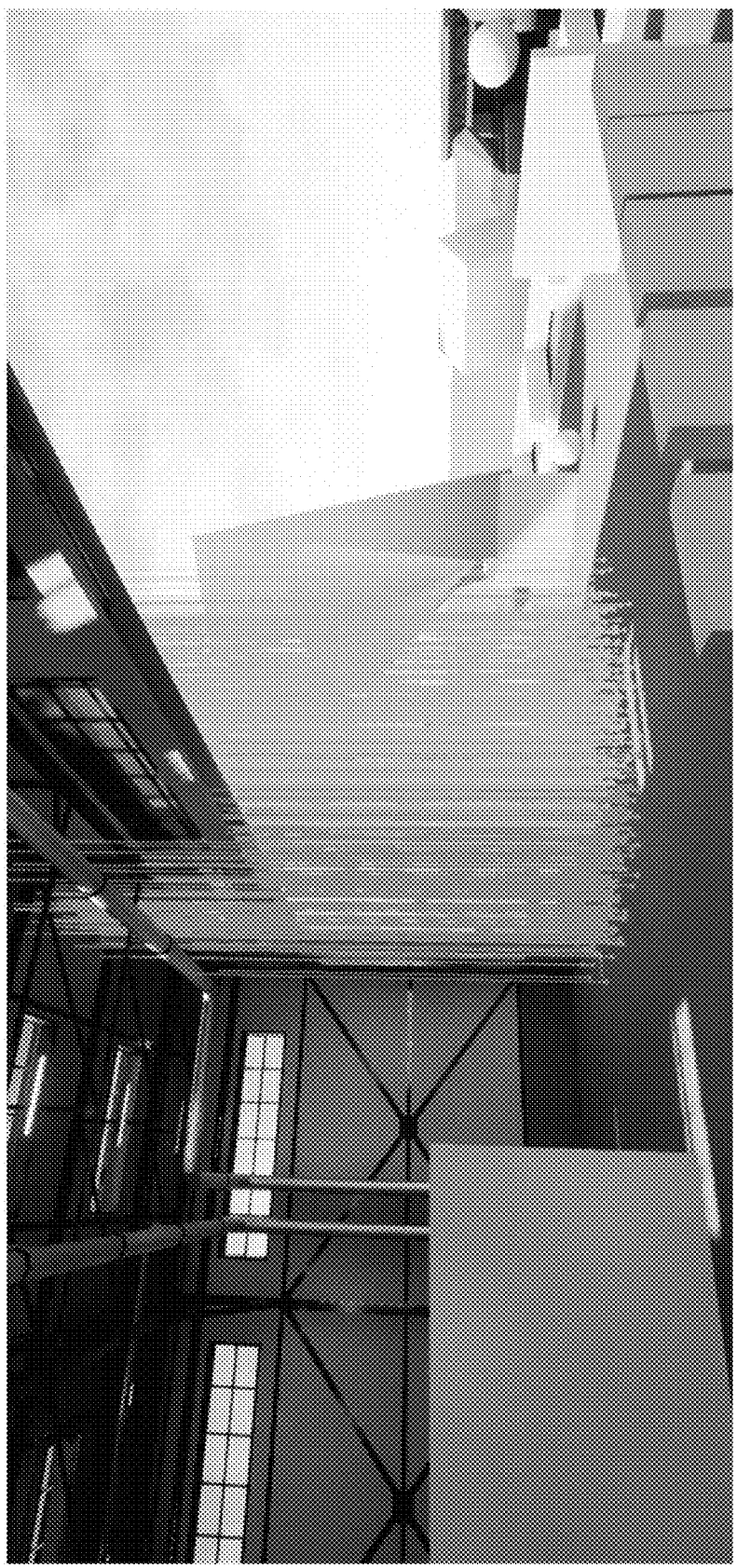
FIG. 7B shows an further example visualisation of vertical ray traces within the 3B environment.

FIG. 7B shows the same plurality of vertical ray traces, but from a more distant perspective. In this example, the plurality of vertical ray traces cover an area that extends around the character location 620. Ray traces that "hit" an object, and are therefore an "indoor" ray trace, are shaded in one colour and can be seen towards the left side of the group of ray traces in FIG. 7B. Ray traces that do not "hit" an object, and are therefore an "outdoor" ray trace, are shaded in a different colour and can be seen towards the right side of the group of ray traces in FIG. 7B.

An audio track modification that may be determined based on indoor/outdoor status is the nature of reverberation (reverb) that should be applied when generating the modified audio signal. Typically, more reverb is experienced within indoor spaces than outdoor spaces, owing to echoes and reflections. Therefore, if the character is indoors, any sound they hear is likely to have more prominent reverb than if they are outdoors, so for a realistic audio experience the modified audio signal is generated in a way that reflects that. In some scenarios, there may be two predetermined types of reverb, one for indoor and one for outdoor. If the vertical ray trace data indicates that the character is indoors (for example because more than 50% of the ray traces indicate indoors), then the indoor reverb settings are used, and if the vertical ray trace data indicates that the character is outdoors (for example because more than 50% of the ray traces indicate outdoors), then the outdoor reverb settings are used. Alternatively, there may be more predetermined reverb settings, for example four, or eight, or 12, etc, each of which may be used depending on the extent to which the character is found to be indoors or outdoors (for example, if the ray traces indicate 8% indoor, then the reverb setting for 0-10% indoors may be used, and if the ray traces indicate 61% indoor, the reverb setting for 60-70% indoors may be used, etc). In an alternative, the reverb settings may be continuously variable based on the indoor/outdoor ratio, for example by using interpolation between pre-set coefficients for specific indoor/outdoor ratios, or by using formulae linking each reverb coefficient to the determined ratio.

Additionally or alternatively to indicating the indoor/outdoor status of the audio source and/or character, the size of the space in which the audio source or character are located may be determined in Step S140. This may be done in a number of different ways. In one example, the volume of the space is determined, for example by using bounding boxes. In particular, a plurality of non-overlapping 3D bounding boxes may be sequentially generated in the 3D space defined by the simplified 3D environment data. Each bounding box may be generated to expand in each of three dimensions until another bounding box is reached (which might be a closed bounding box that represents a physical feature in the 3D environment, or another bounding box used for determining the volume of the space). For example, a first bounding box may start near the audio source location or character location and expand in each dimension until each surface of the box meets another bounding box. The first bounding box is then filling the largest amount of space it can. A second bounding box may then be generated in another space near the audio source location or character location and expand in each dimension until each surface of the box meets another bounding box. The second bounding box is then filling the largest amount of space it can. This may be repeated a predetermined number of times (for example two times, four times, eight times, sixteen times, etc), such that the connected network (for example, the connected open bounding box space) within which the audio source or character is located is largely filled with volume finding bounding boxes. The volume of those bounding boxes may then be summed to arrive at a volume for the space. This process is relatively fast and efficient, since it is computationally straightforward, and has been found to give a reasonable approximation of the volume of the space.

The volume of the space may be used to determine the nature of reverb to be applied to the audio track when generating the modified audio signal. It is generally understood that the nature of reverb can change for different size rooms/space. For example, a larger space may experience shorter reverberation times for lower frequencies, and longer decays for higher frequencies. Therefore, the determined volume of the room may be used to set reverb coefficients to be applied to the audio track. In one example, a number of pre-set reverb coefficients may be defined, each for a different range of room volumes (for example, four, or eight, or 12, etc different reverb settings may be pre-defined). In an alternative, the reverb settings may be continuously variable based on the determined volume of room, for example by using interpolation between pre-set coefficients for specific room volumes, or by using formulae linking each reverb coefficient to the determined volume of room.

Additionally or alternatively, the size of the space may be defined by the ceiling height of the space. Ceiling height may be determined using a plurality of vertical ray traces, as described earlier with reference to indoor/outdoor determination. The average ceiling height of a space (either mean, modal or median) may be determined using the determined length of each vertical ray trace, with ray traces that return no result (i.e., ray traces in an outdoor location) being set to a predetermined large value.

It is generally understood that ceiling height can affect the nature of reverb, for example reverb being different for a space with a low ceiling than for a space of the same volume but having a high ceiling. Therefore, knowing the ceiling height may be a useful factor in determining the coefficients of the reverb to be applied to the audio track, particularly in combination with the overall volume of the space.

Additionally or alternatively, the determined environmental data may include the predominant material (for example, metal, wood, fabric, etc) of the space in which the audio source or character is located. This may be determined from the simplified 3D environment data, which may include a material for the surfaces of each bounding box. For example, each open bounding box in the connected network in which the audio source and/or character is located may have a material associated with at least one of its surfaces, which is the material of the object (eg, wall, floor, etc) that that open bounding box surface abuts. As the skilled person will appreciate, data relating to materials is often included within the physics engine data, so this information can straightforwardly be included within the simplified 3D environment data. The predominant material (for example, the modal material) for the space in which the audio source or character is located may be determined by summing the total area of bounding box surfaces for each material type.

It is generally understood that different materials have different reverb properties, for example metal may cause more reverb than fabric as fabric absorbs more sound. Each material may have predetermined reverb coefficient settings, so determining the predominant material in the space may help to improve the realism of reverb applied to the audio track when generating the audio signal.

The skilled person will readily appreciate that various alterations or modifications may be made to the above described aspects of the disclosure without departing from the scope of the disclosure.

For example, generating the simplified 3D environment data may comprise only step S210, in which case the simplified 3D environment data may include only a closed bounding box set. The simplified 3D environment data in this case will still be useful as the process of determining the modification to be applied to the audio track (Step S140) works on a smaller amount of data than if it worked on the physics engine data, and so will be faster and more efficient. However, if Step S220 is also performed and the simplified 3D environment data includes at least an open bounding box set this may be even further beneficial as the above described processes relating to determining the audio track modification(s) may operate even more quickly and efficiently on open bounding boxes (for example, determining the audio propagation path using open bounding boxes is more straightforward than when using closed bounding boxes). This is improvement in efficiency and speed is even further enhanced if Steps S230 and S240 are performed and the simplified 3D environment data includes a record of open bounding box connected networks, since this makes it even easier to understand the open space around the audio source and/or character, and therefore faster to analyse when determining the audio track modifications.

FIG. 8 is a block diagram of an exemplary computing device 800, which may be used to implement the systems, methods and software described herein. As shown in FIG. 8, the computing device 800 includes a processor 810, memory 820, a communications interface 830, along with storage 840, and an input/output interface 850. Some of these elements may or may not be present, depending on the implementation. Further, although these elements are shown independently of one another, each may, in some cases, be integrated into another.

The processor 810 may be or include one or more microprocessors, microcontrollers, digital signal processors, application specific integrated circuits (ASICs), or a systems-on-a-chip (SOCs). The memory 820 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 820 may store software programs and routines for execution by the processor. These stored software programs may include an operating system software. The operating system may include functions to support the input/output interface 250, such as protocol stacks, coding/decoding, compression/decompression, and encryption/decryption. The stored software programs may include an application or "app" to cause the computing device to perform portions of the processes and functions described herein. The word "memory", as used herein, explicitly excludes propagating waveforms and transitory signals. The application can perform the functions described herein.

The communications interface 830 may include one or more wired interfaces (e.g. a universal serial bus (USB), high definition multimedia interface (HDMI)), one or more connectors for storage devices such as hard disk drives, flash drives, or proprietary storage solutions. The communications interface 830 may also include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol. The cellular telephone network interface and/or the wireless LAN interface may be used to communicate with devices external to the computing device 800.

The communications interface 830 may include radio-frequency circuits, analog circuits, digital circuits, one or more antennas, and other hardware, firmware, and software necessary for communicating with external devices. The communications interface 830 may include one or more specialized processors to perform functions such as coding/decoding, compression/decompression, and encryption/decryption as necessary for communicating with external devices using selected communications protocols. The communications interface 830 may rely on the processor 810 to perform some or all of these function in whole or in part.

Storage 840 may be or include non-volatile memory such as hard disk drives, flash memory devices designed for long-term storage, writable media, and proprietary storage media, such as media designed for long-term storage of data. The word "storage", as used herein, explicitly excludes propagating waveforms and transitory signals.

The input/output interface 850, may include a display and one or more input devices such as a touch screen, keypad, keyboard, stylus or other input devices. The input/output interface 250 may include audio input/output capability. A display may also interact using the input/output interface 850. The processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including, for example, variations of the Linux, Microsoft Windows, Symbian, and Apple Mac operating systems.

The techniques may be implemented with machine readable storage media in a storage device included with or otherwise coupled or attached to a computing device 800. That is, the software may be stored in electronic, machine readable media. These storage media include, for example, magnetic media such as hard disks, optical media such as compact disks (CD-ROM and CD-RW) and digital versatile disks (DVD and DVD+RW), flash memory cards, and other storage media. As used herein, a storage device is a device that allows for reading and/or writing to a storage medium. Storage devices include hard disk drives, DVD drives, flash memory devices, and others.

Figure 9:
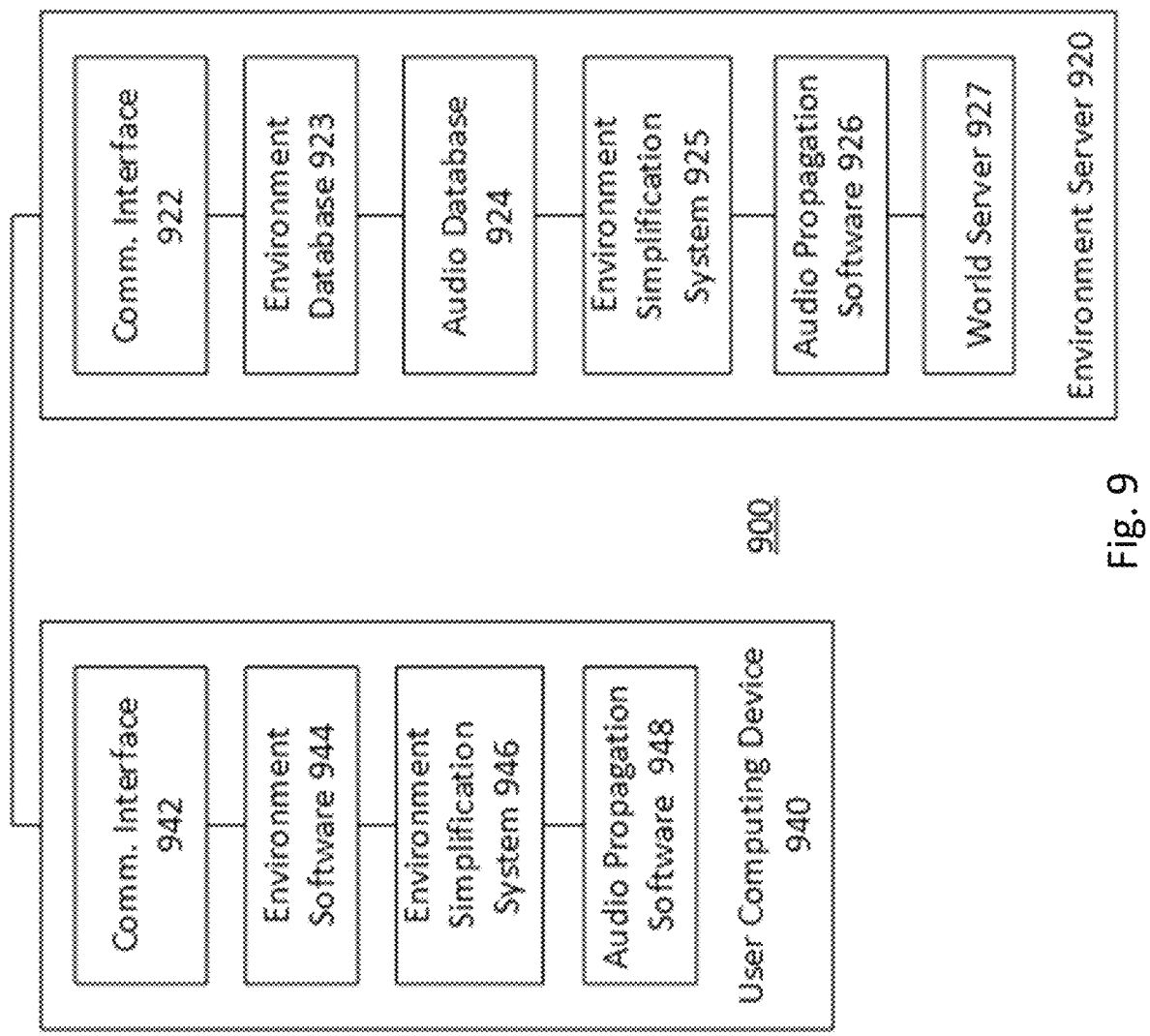
FIG. 9 is a functional block diagram of a system for audio signal generation.

FIG. 9 is a functional block diagram of a system for audio signal generation. FIG. 9 includes a user computing device 940 and an environment server 920. Both of these are computing devices (FIG. 8). Though shown as two distinct computing devices in FIG. 9, some or all elements of either the user computing device 940 or environment server 920 may be implemented on other computing devices such as multiple physical server devices, rely upon cloud computing which may use a plurality of computing devices to accomplish a task, or may offload some functions while retaining others (e.g. the user computing device 940 may allow a remote server to complete the environment simplification process discussed with reference to FIG. 2 above). The functional block diagram of FIG. 9 is the most-likely formation of the components described.

The environment server 920 includes a communications interface 922, an environment database 923, an audio database 924, an environment simplification system 925, audio propagation software 926, and a world sever 927.

The communications interface 922 is software that enables communications between the constituent parts of the system 900. The communications interface 922 may be or include traditional internet protocol communications software along with the associated network stack. However, specialized software for authentication between the environment server 920 and the user computing device 940 (and other user computing devices) may also be present to ensure security and rightful access to the environment server by connecting devices. In addition, information may be sent using the communications interface 922 to ensure synchronicity between the environment server 920 and any connected user computing device, such as user computing device 940.

The environment database 923 is software operating on the environment server 920 which stores and enables access to maps, models, and textures for the 3D environment as well as avatars and characters and objects and items and vehicles and the like moving about and present within the 3D environment. Copies of these elements are preferably distributed and stored on each user computing device as the corresponding software is installed on the user computing device 940. However, in the case that a model or texture is updated, the environment database 923 may store those data files as well and provide them on-demand as needed.

One such example, might be an update to a model to alter its hit box or collision or non-collision flag. If that occurs, it may alter the course of the audio transformation described herein. Or, user generated content may be stored in the environment database 923. In such a case, the model, texture and the like for that content may be stored, along with a collision or non-collision flag as well as any associated hit box for the object. Finally, the hashes discussed above may be stored alongside the associated model for easy access.

The audio database 924 is database software and/or a file system on the environment server 920 for storing associated audio used within the 3D environment. This audio may likewise be installed on user computing devices, like user computing device 940, but may be made available on the environment server 920 for download as-needed.

The environment simplification system 925 is software operating upon the environment server 920 for purposes of simplifying the 3D environment to enable transformation of audio within that 3D environment. This is the system whose function is described with reference to FIG. 2 above. The overall function of the environment simplification system 925 is to enable the server 920 to provide a simplified version of the 3D environment for purposes of audio manipulation. In most cases, this system 925 will actually operate upon the user computing device 940 (discussed below), but it may operate in some cases on the environment server 920.

The audio propagation software 926 is software operating upon the environment server 920 that alters, manipulates, filters or otherwise changes audio within the 3D environment or presented to the user as within the 3D environment in accordance with relevant changes as a result of the properties of the 3D environment and based upon the simplified 3D environment generated by the environment simplification system 925. So, for example, the audio propagation software 926 may cause sound to sound, to a hearer, as though it is very far away, incorporates an echo, or to sound as though it is within a cave or small enclosed space (or large space). The manipulation for those effects may be accomplished by audio propagation software 926. Though the audio propagation software 926 is shown as a part of the environment server—and it may be so—it preferably operates upon the user computing device 940.

The world server 927 is software operating on the environment server 920 that provides access to and information related to the 3D environment to all connected user computing devices, like user computing device 940. In most cases, the primary purpose of world server 927 is to synchronize data across connected users so that as player characters move about in the world or world events occur, or actions are taken by the server itself or by other players, they appear to all other players. This is done through continuous messaging between the world server 927 and connected user computing devices. The world server 927 may identify particular areas or coordinates within a shared game world or other 3D environment as having certain characteristics, models, textures, and characters (also made up of models and textures) in certain positions and orientations within the 3D environment.

The user computing device 940 includes a communications interface 942, environment software 944, an environment simplification system 946, and audio propagation software 948.

The communications interface 942 serves a similar, but counterpart, function within the user computing device 940 to that of the communications interface 922 for the environment server 920. The communications interface 942 enables the user computing device 940 to communicate with the environment server 920 and with other user computing devices.

The environment software 944 is software, and potentially data repositories or databases, suitable to generate the 3D environment on the user computing device 940. This is preferably on a display associated with the user computing device, but may be on a virtual reality or augmented reality headset, on a mobile device screen, or on some other device where the 3D environment may be seen. The environment software may include or have access to models and textures associated with locations within the 3D environment as well as characters and items and objects within the 3D environment. It may also include or have access to the audio files used to generate sound as discussed herein in accordance with the form of the 3D environment and the methods described herein.

The environment simplification system 946 is similar to the environment simplification system 925 discussed above. Preferably, this system operates independently on each user computing device to access the data and files making up the 3D environment and to engage in a simplification process (FIG. 2, above) to generate a simplified 3D environment for purposes of altering audio from one or more audio sources to correspond to the player character's location and the source, within the 3D environment, of each portion of audio.

The audio propagation software 948 is software that relies upon the simplified environment created by the environment simplification system 946 to alter audio from one or more audio sources to correspond to the player character's location and the source, within the 3D environment, of each portion of audio.

EXAMPLE ASPECTS

Non-limiting example aspects of the disclosure are set out in the following numbered clauses:

1. A system for generating a modified audio signal associated with a computer generated three-dimensional, 3D environment in which a computer generated character is located at a character location, the system comprising a computing device configured to:
   obtain physics engine data defining physical features of the computer generated 3D environment;
   obtain an audio track associated with an audio source positioned at an audio source location in the computer generated 3D environment;
   generate simplified 3D environment data using the physics engine data, wherein the simplified 3D environment data comprises a simplified representation of physical features of the computer generated 3D environment;
   determine, using the simplified 3D environment data and the audio source location and/or character location, a modification to be applied to the audio track in order to generate the modified audio signal; and
   generate the modified audio signal by applying the modification to the audio track.

2. The system of clause 1, wherein the system is configured to perform its operations in real-time while a user is controlling the computer generated character within the computer generated 3D environment.

3. The system of any preceding clause configured to determine the modification to be applied to the audio track by:
   determining an audio propagation path through the computer generated 3D environment between the audio source location and the character location; and
   determining the modification based at least in part on a length of the audio propagation path.

4. The system of clause 3, wherein determining the audio propagation path comprises using a path finding algorithm to navigate a shortest path between the audio source location and the character location through the computer generated 3D environment defined by the simplified 3D environment data.

5. The system of clause 3 or clause 4, wherein determining the modification to be applied to the audio track further comprises:
   determining a straight line direct distance between the audio source location and the character location; and
   determining the modification further based on the straight line direct distance.

6. The system of any of clauses 3 to 5, wherein determining the modification to be applied to the audio track further comprises:
   determining, based on the audio propagation path, a virtual location for the audio source in the computer generated 3D environment; and
   determining the modification based at least in part on any one or more of:
   the distance of the virtual location relative to the character location;
   the distance of the virtual location relative to the audio source location; and
   inputting the virtual location to an audio attenuation curve.

7. The system of any of clauses 3 to 6, wherein the modification to be applied to the audio track comprises any one or more of:
   a volume attenuation to be applied to the audio track;
   at least one coefficient for a low-pass filter through which the audio track is passed in order to generate the modified audio signal;
   at least one coefficient for a high-pass filter through which the audio track is passed in order to generate the modified audio signal.

8. The system of any preceding clause configured to determine the modification to be applied to the audio track by:
   determining, based on the simplified 3D environment data, environmental data indicative of at least one environmental property of the computer generated 3D environment; and
   determining the modification to be applied to the audio track is based at least in part on the environmental properties at the character location and/or the audio source location.

9. The system of clause 8, wherein the environmental data is indicative of an indoor/outdoor status of at least part of the computer generated 3D environment, and
   wherein determining the environmental data comprises tracing a plurality of vertical ray traces at different locations within the at least part of the computer generated 3D environment.

10. The system of clause 9, wherein determining the environmental data comprises determining a first number of the plurality of vertical ray traces that indicate an indoor environment and a second number of the plurality of the vertical traces that indicate an output environment, and wherein the environmental data is indicative of a proportion of the plurality of ray traces that indicate an indoor environment or outdoor environment.

11. The system of any of clauses 8 to 10, wherein the at least one environmental property comprises a size of a space in the computer generated 3D environment that contains the audio source location and/or the character location.

12. The m system of clause 11, wherein the size of the space comprises a physical volume of the space in the computer generated 3D environment.

13. The system of clause 12, wherein determining the environmental data comprises:
  sequentially generating a plurality of non-overlapping 3D bounding boxes around the computer generated character, where each bounding box is generated to expand in each of three dimensions until a physical feature of the computer generated 3D environment or another 3D bounding box is reached; and
  determining the physical volume of the space in the computer generated 3D environment by summing the volume of each of the plurality of 3D bounding boxes.

14. The system of any of clauses 11 to 13, wherein the size of the space comprises a ceiling height of the space in the computer generated 3D environment.

15. The system of any of clauses 8 to 14, wherein the at least one environmental property comprises a dominant material in a space in the computer generated 3D environment that contains the audio source location and/or the character location, and
  wherein determining the environmental data comprises determining the dominant material by identifying, using the simplified 3D environment data, the most common type of material in the space in the computer generated 3D environment that contains the audio source location.

16. The system of any of clauses 8 to 15, wherein the modification to be applied to the audio track comprises an amount of reverb to be applied to the audio track.

17. The system of any preceding clause, wherein the physics engine data comprises collision data and/or graphical mesh data, and
  wherein the system is configured to generate the simplified 3D environment data by converting the physics engine data to a plurality of closed bounding boxes, each closed bounding box defining a size and a location of at least part of a physical feature in the computer generated 3D environment.

18. The system of clause 17, wherein generating the simplified 3D environment data further comprises:
  inverting the closed bounding box data to generate open bounding box data that defines a plurality of open bounding boxes that each represent an empty space in the 3D environment,
  wherein the simplified 3D environment data comprises the open bounding box data.

19. The system of clause 18, wherein generating the simplified 3D environment data further comprises:
  identifying open bounding boxes that are connected; and
  creating a record of connected open bounding boxes such that the record identifies a plurality of connected open bounding boxes that together make up an open bounding box connected network,
  wherein the simplified 3D environment data comprises the record of connected open bounding boxes.

20. The system of any preceding clause, wherein the modified audio signal is a digital audio signal generated by applying the modification to a digital version of the audio track.

21. The system of any of clauses 1 to 19, wherein the modified audio signal is an analog voltage signal, or a sound wave signal that is played to the user.

22. An apparatus comprising non-volatile machine-readable storage medium storing a program for generating a modified audio signal associated with a computer generated three-dimensional, 3D, environment in which a computer generated character is located at a character location, the program having instructions which when executed by a computing device cause the computing device to:
  obtain physics engine data defining physical features of the computer generated 3D environment;
  obtain an audio track associated with an audio source positioned at an audio source location in the computer generated 3D environment;
  generate simplified 3D environment data using the physics engine data, wherein the simplified 3D environment data comprises a simplified representation of physical features of the computer generated 3D environment;
  determine, using the simplified 3D environment data and the audio source location and/or character location, a modification to be applied to the audio track in order to generate the modified audio signal; and
  generate the modified audio signal by applying the modification to the audio track.

23. The apparatus of clause 22 further comprising:
  the processor; and
  a memory,
  wherein the processor and the memory comprise circuits and software for performing the instructions on the storage medium.

24 A computer implemented method for generating a modified audio signal associated with a computer generated three-dimensional, 3D, environment in which a computer generated character is located at a character location, the method comprising:
  obtaining physics engine data defining physical features of the computer generated 3D environment;
  obtaining an audio track associated with an audio source positioned at an audio source location in the computer generated 3D environment;
  generating simplified 3D environment data using the physics engine data, wherein the simplified 3D environment data comprises a simplified representation of physical features of the computer generated 3D environment;
  determining, using the simplified 3D environment data and the audio source location and/or character location, a modification to be applied to the audio track in order to generate the modified audio signal; and
  generating the modified audio signal by applying the modification to the audio track.

25. The method of clause 24, wherein the method is performed in real-time while a user is controlling the computer generated character within the computer generated 3D environment.

26. The method of clause 24 or clause 25, wherein determining the modification to be applied to the audio track comprises:
  determining an audio propagation path through the computer generated 3D environment between the audio source location and the character location; and determining the modification based at least in part on a length of the audio propagation path.

27. The method of clause 26, wherein determining the audio propagation path comprises using a path finding algorithm to navigate a shortest path between the audio source location and the character location through the computer generated 3D environment defined by the simplified 3D environment data.

28. The method of clause 26 or clause 27, wherein determining the modification to be applied to the audio track further comprises:
determining a straight line direct distance between the audio source location and the character location; and
determining the modification further based on the straight line direct distance.

29. The method of any of clauses 26 to 28, wherein determining the modification to be applied to the audio track further comprises:
determining, based on the audio propagation path, a virtual location for the audio source in the computer generated 3D environment; and
determining the modification based at least in part on any one or more of:
the distance of the virtual location relative to the character location;
the distance of the virtual location relative to the audio source location; and
inputting the virtual location to an audio attenuation curve.

30 The method of any of clauses 26 to 29, wherein the modification to be applied to the audio track comprises any one or more of:
a volume attenuation to be applied to the audio track;
at least one coefficient for a low-pass filter through which the audio track is passed in order to generate the modified audio signal;
at least one coefficient for a high-pass filter through which the audio track is passed in order to generate the modified audio signal.

31. The method of any of clauses 26 to 30, wherein determining the modification to be applied to the audio track comprises:
determining, based on the simplified 3D environment data, environmental data indicative of at least one environmental property of the computer generated 3D environment; and
determining the modification to be applied to the audio track is based at least in part on the environmental properties at the character location and/or the audio source location.

32. The method of clause 31, wherein the environmental data is indicative of an indoor/outdoor status of at least part of the computer generated 3D environment, and
wherein determining the environmental data comprises tracing a plurality of vertical ray traces at different locations within the at least part of the computer generated 3D environment.

33. The method of clause 32 wherein determining the environmental data comprises determining a first number of the plurality of vertical ray traces that indicate an indoor environment and a second number of the plurality of the vertical traces that indicate an output environment, and
wherein the environmental data is indicative of a proportion of the plurality of ray traces that indicate an indoor environment or outdoor environment.

34. The method of any of clauses 31 to 33 wherein the at least one environmental property comprises a size of a space in the computer generated 3D environment that contains the audio source location and/or the character location.

35. The method of clause 34, wherein the size of the space comprises a physical volume of the space in the computer generated 3D environment.

36. The method of clause 35, wherein determining the environmental data comprises:
sequentially generating a plurality of non-overlapping 3D bounding boxes around the computer generated character, where each bounding box is generated to expand in each of three dimensions until a physical feature of the computer generated 3D environment or another 3D bounding box is reached; and
determining the physical volume of the space in the computer generated 3D environment by summing the volume of each of the plurality of 3D bounding boxes.

37. The method of any of clauses 34 to 36, wherein the size of the space comprises a ceiling height of the space in the computer generated 3D environment.

38. The method of any of clauses 31 to 37, wherein the at least one environmental property comprises a dominant material in a space in the computer generated 3D environment that contains the audio source location and/or the character location, and
wherein determining the environmental data comprises determining the dominant material by identifying, using the simplified 3D environment data, the most common type of material in the space in the computer generated 3D environment that contains the audio source location.

39. The method of any of clauses 31 to 38, wherein the modification to be applied to the audio track comprises an amount of reverb to be applied to the audio track.

40. The method of any of clauses 24 to 39, wherein the physics engine data comprises collision data and/or graphical mesh data, and
wherein generating the simplified 3D environment data comprises converting the physics engine data to a plurality of closed bounding boxes, each closed bounding box defining a size and a location of at least part of a physical feature in the computer generated 3D environment.

41. The method of clause 40, wherein generating the simplified 3D environment data further comprises:
inverting the closed bounding box data to generate open bounding box data that defines a plurality of open bounding boxes that each represent an empty space in the 3D environment,
wherein the simplified 3D environment data comprises the open bounding box data.

42. The method of clause 41, wherein generating the simplified 3D environment data further comprises:
identifying open bounding boxes that are connected; and
creating a record of connected open bounding boxes such that the record identifies a plurality of connected open bounding boxes that together make up an open bounding box connected network,
wherein the simplified 3D environment data comprises the record of connected open bounding boxes.

43. The method of any of clauses 24 to 42, wherein the modified audio signal is a digital audio signal generated by applying the modification to a digital version of the audio track.

44. The method of any of clauses 24 to 42, wherein the modified audio signal is an analog voltage signal, or a sound wave signal that is played to the user.

45. A computer program configured to perform the method of any of clauses 24 to 44 when executed on at least one processor of an electronic device.

46. A system for generating a modified audio signal associated with a computer generated three-dimensional, 3D environment in which a computer generated character is located at a character location, the system comprising a computing device configured to intermittently, and in real-time while a user is controlling the computer generated character within the computer generated 3D environment:
for each of a plurality of sectors of the computer generated 3D environment:
obtain physics engine data defining physical features of the sector of the computer generated 3D environment;
generate a hash of the physics engine data defining physical features of the sector of the computer generated 3D environment;
compare the generated hash against a previously determined, stored hash of physics engine data for the sector of the computer generated 3D environment;
wherein, if the generated hash is different to the previously determined, stored hash, then:
replace the previously determined, stored hash with the generated hash;
generate simplified 3D environment data for the sector using the physics engine data defining physical features of the sector of the computer generated 3D environment, wherein the simplified 3D environment data for the sector comprises a simplified representation of physical features of the sector of the computer generated 3D environment; and
replace previously determined, stored simplified 3D environment data for the sector with the generated simplified 3D environment data, wherein the stored simplified 3D environment data for each of the plurality of sectors together form a simplified representation of the physical features of the computer generated 3D environment;
obtain an audio track associated with an audio source positioned at an audio source location in the computer generated 3D environment;
determine, using the stored simplified 3D environment data for at least some of the sectors of the 3D environment, and the audio source location and/or character location, a modification to be applied to the audio track in order to generate the modified audio signal; and
generate the modified audio signal by applying the modification to the audio track.

47. An apparatus comprising non-volatile machine-readable storage medium storing a program for generating a modified audio signal associated with a computer generated three-dimensional, 3D, environment in which a computer generated character is located at a character location, the program having instructions which when executed by a computing device cause the computing device to intermittently, and in real-time while a user is controlling the computer generated character within the computer generated 3D environment:
for each of a plurality of sectors of the computer generated 3D environment:
obtain physics engine data defining physical features of the sector of the computer generated 3D environment;
generate a hash of the physics engine data defining physical features of the sector of the computer generated 3D environment;
compare the generated hash of the physics engine data defining physical features of the sector of the computer generated 3D environment against a previously determined, stored hash of physics engine data for the sector of the computer generated 3D environment;
wherein, if the generated hash is different to the previously determined, stored hash, then:
replace the previously determined, stored hash with the generated hash;
generate simplified 3D environment data for the sector using the physics engine data defining physical features of the sector of the computer generated 3D environment, wherein the simplified 3D environment data for the sector comprises a simplified representation of physical features of the sector computer generated 3D environment; and
replace previously determined, stored simplified 3D environment data for the sector with the generated simplified 3D environment data, wherein the stored simplified 3D environment data for each of the plurality of sectors together form a simplified representation of the physical features of the computer generated 3D environment;
obtain an audio track associated with an audio source positioned at an audio source location in the computer generated 3D environment;
determine, using the stored simplified 3D environment data for at least some of the sectors of the 3D environment, and the audio source location and/or character location, a modification to be applied to the audio track in order to generate the modified audio signal; and
generate the modified audio signal by applying the modification to the audio track.

48. A computer implemented method for generating a modified audio signal associated with a computer generated three-dimensional, 3D, environment in which a computer generated character is located at a character location, the method comprising intermittently, and in real-time while a user is controlling the computer generated character within the computer generated 3D environment:
for each of a plurality of sectors of the computer generated 3D environment:
obtaining physics engine data defining physical features of the sector of the computer generated 3D environment;
generating a hash of the physics engine data defining physical features of the sector of the computer generated 3D environment;
comparing the generated hash of the physics engine data defining physical features of the sector of the computer generated 3D environment against a previously determined, stored hash of physics engine data for the sector of the computer generated 3D environment;
wherein, if the generated hash is different to the previously determined, stored hash, then:
replacing the previously determined, stored hash with the generated hash;
generating simplified 3D environment data for the sector using the physics engine data defining physical features of the sector of the computer generated 3D environment, wherein the simplified 3D environment data for the sector comprises a simplified representation of physical features of the sector computer generated 3D environment; and
replacing previously determined, stored simplified 3D environment data for the sector with the generated simplified 3D environment data, wherein the stored simplified 3D environment data for each of the plurality of sectors together form a simplified representation of the physical features of the computer generated 3D environment;
obtaining an audio track associated with an audio source positioned at an audio source location in the computer generated 3D environment;
determining, using the stored simplified 3D environment data for at least some of the sectors of the 3D environment, and the audio source location and/or character location, a modification to be applied to the audio track in order to generate the modified audio signal; and
generating the modified audio signal by applying the modification to the audio track.

49. A computer program configured to perform the method of clause 48 when executed on at least one processor of an electronic device.

It is claimed:

1. A system for generating a modified audio signal associated with a computer generated three-dimensional, 3D environment in which a computer generated character is located at a character location, the system comprising a computing device configured to:
obtain physics engine data defining physical features of the computer generated 3D environment;
obtain an audio track associated with an audio source positioned at an audio source location in the computer generated 3D environment;
generate simplified 3D environment data using the physics engine data, wherein the simplified 3D environment data comprises a simplified representation of physical features of the computer generated 3D environment;
determine, using the simplified 3D environment data and the audio source location and/or character location, a modification to be applied to the audio track in order to generate the modified audio signal, wherein:
the modification to be applied to the audio track is determined, at least in part, by:
determining an audio propagation path through the computer generated 3D environment between the audio source location and the character location;
determining the modification based at least in part on a length of the audio propagation path; and
generate the modified audio signal by applying the modification to the audio track.

2. The system of claim 1, wherein the system is configured to perform its operations in real-time while a user is controlling the computer generated character within the computer generated 3D environment.

3. The system of claim 1, wherein determining the audio propagation path comprises using a path finding algorithm to navigate a shortest path between the audio source location and the character location through the computer generated 3D environment defined by the simplified 3D environment data.

4. The system of claim 1, wherein determining the modification to be applied to the audio track further comprises a selected one of:
(a) determining a straight line direct distance between the audio source location and the character location; and determining the modification further based on the straight line direct distance; or
(b) determining, based on the audio propagation path, a virtual location for the audio source in the computer generated 3D environment; and
determining the modification based at least in part on any one or more of:
the distance of the virtual location relative to the character location;
the distance of the virtual location relative to the audio source location; and
inputting the virtual location to an audio attenuation curve.

5. The system of claim 1, wherein the modification to be applied to the audio track comprises any one or more of:
a volume attenuation to be applied to the audio track;
at least one coefficient for a low-pass filter through which the audio track is passed in order to generate the modified audio signal;
at least one coefficient for a high-pass filter through which the audio track is passed in order to generate the modified audio signal; and
an amount of reverb to be applied to the audio track.

6. The system of claim 1 configured to determine the modification to be applied to the audio track by:
determining, based on the simplified 3D environment data, environmental data indicative of at least one environmental property of the computer generated 3D environment; and
determining the modification to be applied to the audio track is based at least in part on the environmental properties at the character location and/or the audio source location.

7. The system of claim 6, wherein the environmental data is indicative of an indoor/outdoor status of at least part of the computer generated 3D environment, and
wherein determining the environmental data comprises tracing a plurality of vertical ray traces at different locations within the at least part of the computer generated 3D environment.

8. The system of claim 6, wherein the at least one environmental property comprises a size of a space in the computer generated 3D environment that contains the audio source location and/or the character location.

9. The system of claim 6, wherein determining the environmental data comprises:
sequentially generating a plurality of non-overlapping 3D bounding boxes around the computer generated character, where each bounding box is generated to expand in each of three dimensions until a physical feature of the computer generated 3D environment or another 3D bounding box is reached; and
determining the physical volume of the space in the computer generated 3D environment by summing the volume of each of the plurality of 3D bounding boxes.

10. The system of claim 1, wherein the physics engine data comprises collision data and/or graphical mesh data, and
wherein the system is configured to generate the simplified 3D environment data by converting the physics engine data to a plurality of closed bounding boxes, each closed bounding box defining a size and a location of at least part of a physical feature in the computer generated 3D environment.

11. The system of claim 10, wherein generating the simplified 3D environment data further comprises:
inverting the closed bounding box data to generate open bounding box data that defines a plurality of open bounding boxes that each represent an empty space in the 3D environment,
wherein the simplified 3D environment data comprises the open bounding box data.

12. The system of claim 11, wherein generating the simplified 3D environment data further comprises:

identifying open bounding boxes that are connected; and
creating a record of connected open bounding boxes such that the record identifies a plurality of connected open bounding boxes that together make up an open bounding box connected network,
wherein the simplified 3D environment data comprises the record of connected open bounding boxes.

13. An apparatus comprising non-volatile machine-readable storage medium storing a program for generating a modified audio signal associated with a computer generated three-dimensional, 3D, environment in which a computer generated character is located at a character location, the program having instructions which when executed by a computing device cause the computing device to:
obtain physics engine data defining physical features of the computer generated 3D environment;
obtain an audio track associated with an audio source positioned at an audio source location in the computer generated 3D environment;
generate simplified 3D environment data using the physics engine data, wherein the simplified 3D environment data comprises a simplified representation of physical features of the computer generated 3D environment;
determine, using the simplified 3D environment data and the audio source location and/or character location, a modification to be applied to the audio track in order to generate the modified audio signal, wherein:
the modification to be applied to the audio track is determined, at least in part, by:
determining an audio propagation path through the computer generated 3D environment between the audio source location and the character location;
determining the modification based at least in part on a length of the audio propagation path; and
generate the modified audio signal by applying the modification to the audio track.

14. The apparatus of claim 13 further comprising:
a processor; and
a memory,
wherein the processor and the memory comprise circuits and software for performing the instructions on the storage medium.

15. A method for generating a modified audio signal associated with a computer generated three-dimensional, 3D, environment in which a computer generated character is located at a character location, the method comprising:
obtaining physics engine data defining physical features of the computer generated 3D environment;
obtaining an audio track associated with an audio source positioned at an audio source location in the computer generated 3D environment;
generating simplified 3D environment data using the physics engine data, wherein the simplified 3D environment data comprises a simplified representation of physical features of the computer generated 3D environment;
determining, using the simplified 3D environment data and the audio source location and/or character location, a modification to be applied to the audio track in order to generate the modified audio signal, wherein:
the modification to be applied to the audio track is determined, at least in part, by:
determining an audio propagation path through the computer generated 3D environment between the audio source location and the character location;
determining the modification based at least in part on a length of the audio propagation path; and
generating the modified audio signal by applying the modification to the audio track.

16. The system of claim 15, wherein determining the audio propagation path comprises using a path finding algorithm to navigate a shortest path between the audio source location and the character location through the computer generated 3D environment defined by the simplified 3D environment data.

17. The system of claim 16, wherein determining the modification to be applied to the audio track further comprises a selected one of:
(a) determining a straight line direct distance between the audio source location and the character location; and
determining the modification further based on the straight line direct distance; or
(b) determining, based on the audio propagation path, a virtual location for the audio source in the computer generated 3D environment; and
determining the modification based at least in part on any one or more of:
the distance of the virtual location relative to the character location;
the distance of the virtual location relative to the audio source location; and
inputting the virtual location to an audio attenuation curve.

18. The system of claim 16, wherein the modification to be applied to the audio track comprises any one or more of:
a volume attenuation to be applied to the audio track;
at least one coefficient for a low-pass filter through which the audio track is passed in order to generate the modified audio signal;
at least one coefficient for a high-pass filter through which the audio track is passed in order to generate the modified audio signal; and
an amount of reverb to be applied to the audio track.

19. The system of claim 16 configured to determine the modification to be applied to the audio track by:
determining, based on the simplified 3D environment data, environmental data indicative of at least one environmental property of the computer generated 3D environment; and
determining the modification to be applied to the audio track is based at least in part on the environmental properties at the character location and/or the audio source location.

20. The system of claim 19, wherein the environmental data is indicative of an indoor/outdoor status of at least part of the computer generated 3D environment, and
wherein determining the environmental data comprises tracing a plurality of vertical ray traces at different locations within the at least part of the computer generated 3D environment.

21. The system of claim 19, wherein the at least one environmental property comprises a size of a space in the computer generated 3D environment that contains the audio source location and/or the character location.

22. The system of claim 19, wherein determining the environmental data comprises:
sequentially generating a plurality of non-overlapping 3D bounding boxes around the computer generated character, where each bounding box is generated to expand in each of three dimensions until a physical feature of the computer generated 3D environment or another 3D bounding box is reached; and determining the physical volume of the space in the computer generated 3D environment by summing the volume of each of the plurality of 3D bounding boxes.

23. The system of claim 15, wherein the physics engine data comprises collision data and/or graphical mesh data, and
wherein the system is configured to generate the simplified 3D environment data by converting the physics engine data to a plurality of closed bounding boxes, each closed bounding box defining a size and a location of at least part of a physical feature in the computer generated 3D environment.

24. The system of claim 23, wherein generating the simplified 3D environment data further comprises:
inverting the closed bounding box data to generate open bounding box data that defines a plurality of open bounding boxes that each represent an empty space in the 3D environment,
wherein the simplified 3D environment data comprises the open bounding box data.

25. The system of claim 24, wherein generating the simplified 3D environment data further comprises:
identifying open bounding boxes that are connected; and
creating a record of connected open bounding boxes such that the record identifies a plurality of connected open bounding boxes that together make up an open bounding box connected network,
wherein the simplified 3D environment data comprises the record of connected open bounding boxes.

* * * * *